(12) United States Patent
Okada et al.

(10) Patent No.: US 10,200,577 B2
(45) Date of Patent: Feb. 5, 2019

(54) INVESTIGATION SYSTEM

(71) Applicant: Hitachi-GE Nuclear Energy, Ltd., Hitachi-shi, Ibaraki (JP)

(72) Inventors: Satoshi Okada, Tokyo (JP); Ryousuke Kobayashi, Tokyo (JP); Kouji Ishizawa, Hitachi (JP); Takanori Satou, Hitachi (JP); Yoshinori Takahashi, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 230 days.

(21) Appl. No.: 14/849,867

(22) Filed: Sep. 10, 2015

(65) Prior Publication Data
US 2016/0094761 A1 Mar. 31, 2016

(30) Foreign Application Priority Data
Sep. 26, 2014 (JP) .................................. 2014-197063

(51) Int. Cl.
*H04N 5/225* (2006.01)
*G21C 17/00* (2006.01)
(Continued)

(52) U.S. Cl.
CPC ........... *H04N 5/2252* (2013.01); *G21C 17/00* (2013.01); *G21C 17/013* (2013.01);
(Continued)

(58) Field of Classification Search
CPC .................................................. G21C 17/003
See application file for complete search history.

(56) References Cited

U.S. PATENT DOCUMENTS 4,502,407 A 3/1985 Stevens
5,363,935 A 11/1994 Schempf et al.
(Continued)

FOREIGN PATENT DOCUMENTS

CH 703740 A2 * 3/2012 ............ G01C 11/00
DE 102006020241 A1 10/2007
(Continued)

OTHER PUBLICATIONS

Communication Pursuant to Article 94(3) EPC received in corresponding European Application No. 15 182 592.4 dated Aug. 8, 2016.
(Continued)

*Primary Examiner* — Jorge L Ortiz Criado
*Assistant Examiner* — Kyle M Lotfi
(74) *Attorney, Agent, or Firm* — Mattingly & Malur, PC

(57) ABSTRACT

Since an investigation apparatus is connected through a cable and is remotely operated, the cable may be caught by an obstacle, thereby limiting a movement range of the investigation apparatus. An investigation system 15 includes an investigation apparatus 50 which moves to a position where an investigation target is investigated, by using a traveling section 51 and a support apparatus 30 which moves to a position where letting-off and winding of a cable 14 for an investigation apparatus which is connected to the investigation apparatus 50 are performed, by using a traveling section 31. The investigation apparatus 50 outputs an image of the investigation target which is captured by a camera section 53, to an investigation apparatus controller 40 via the cable 14 for an investigation apparatus.

12 Claims, 19 Drawing Sheets

(51) Int. Cl.
  *G21C 17/013* (2006.01)
  *G21C 17/017* (2006.01)
  *H04N 7/18* (2006.01)
  *F16L 101/30* (2006.01)

(52) U.S. Cl.
  CPC .......... *G21C 17/017* (2013.01); *H04N 7/183* (2013.01); *F16L 2101/30* (2013.01); *H04N 2005/2255* (2013.01); *Y02E 30/39* (2013.01)

(56) References Cited

U.S. PATENT DOCUMENTS

| | | | |
|---|---|---|---|
| 7,334,341 B2 * | 2/2008 | Donaldson | G21C 17/007 33/286 |
| 8,605,145 B2 * | 12/2013 | Webster | F22B 37/002 15/3 |
| 2008/0164079 A1 | 7/2008 | Jacobsen | |
| 2013/0195238 A1 | 8/2013 | Ohmori et al. | |

FOREIGN PATENT DOCUMENTS

| | | | | |
|---|---|---|---|---|
| GB | 509607 A | | 7/1939 | |
| JP | 560106192 A | * | 8/1981 | |
| JP | 58-172904 U | | 11/1983 | |
| JP | 59035137 A | * | 2/1984 | .......... G01N 29/265 |
| JP | 4-140010 A | | 5/1992 | |
| JP | 11-116136 A | | 4/1999 | |
| JP | 2005-221384 A | | 8/2005 | |
| JP | 2007278856 A | * | 10/2007 | |
| JP | 2013-113597 A | | 6/2013 | |
| JP | 2013113597 A | * | 6/2013 | |
| WO | WO87002635 A | * | 5/1985 | |

OTHER PUBLICATIONS

Japanese Office Action received in corresponding Japanese Application No. 2014-197063 dated May 23, 2017.
Japanese Office Action received in corresponding Japanese Application No. 2017-140850 dated May 22, 2018.

* cited by examiner

[Fig. 1]
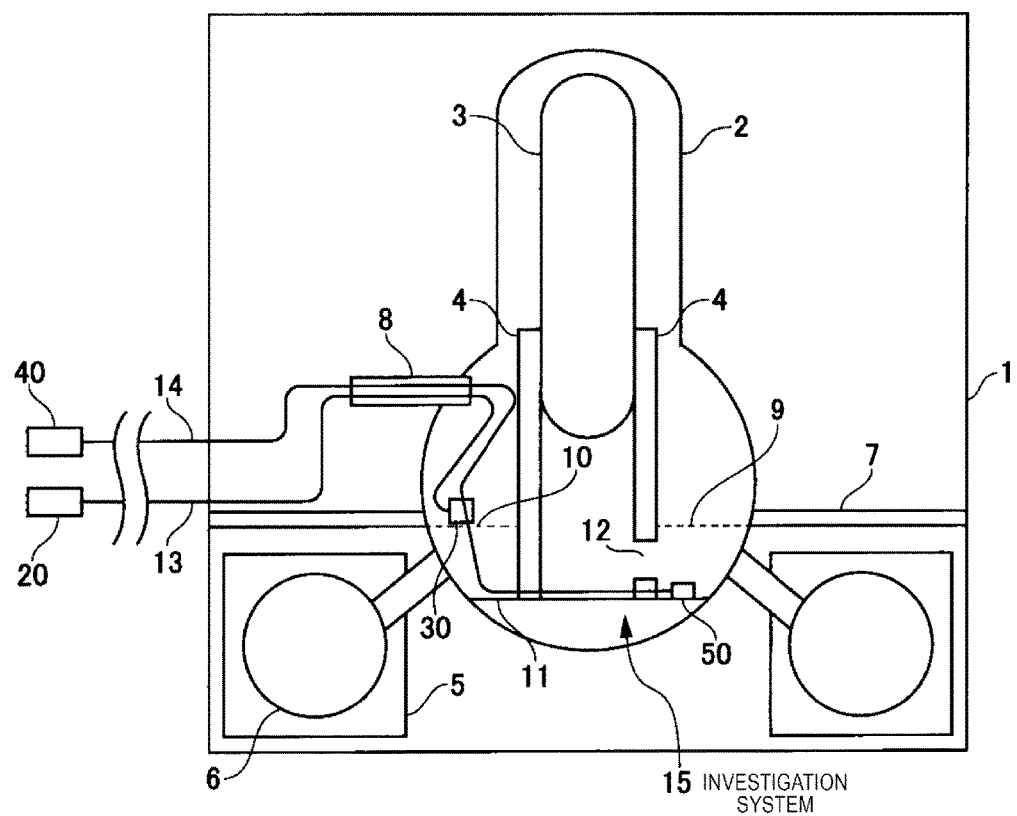

[Fig. 2]
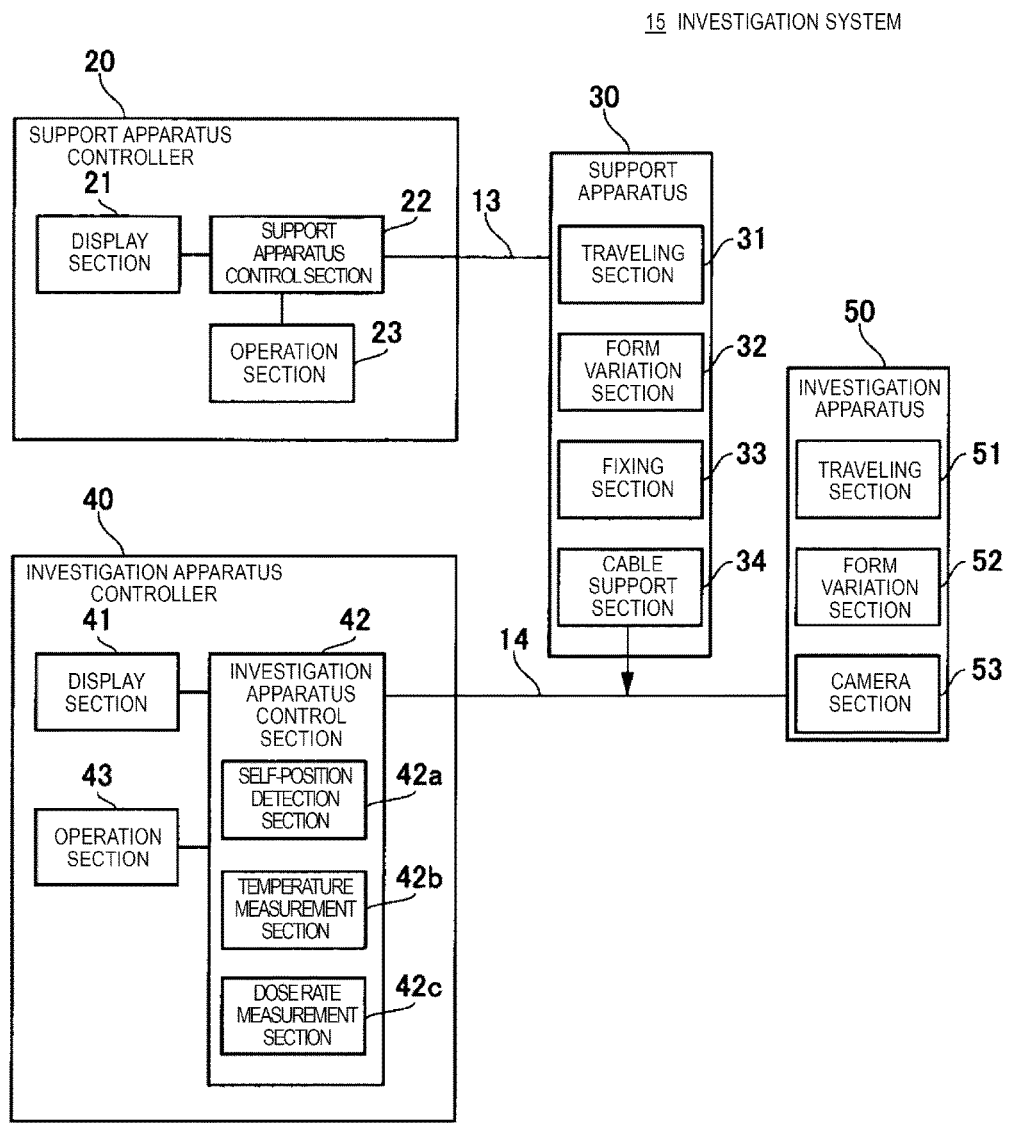

[Fig. 3]
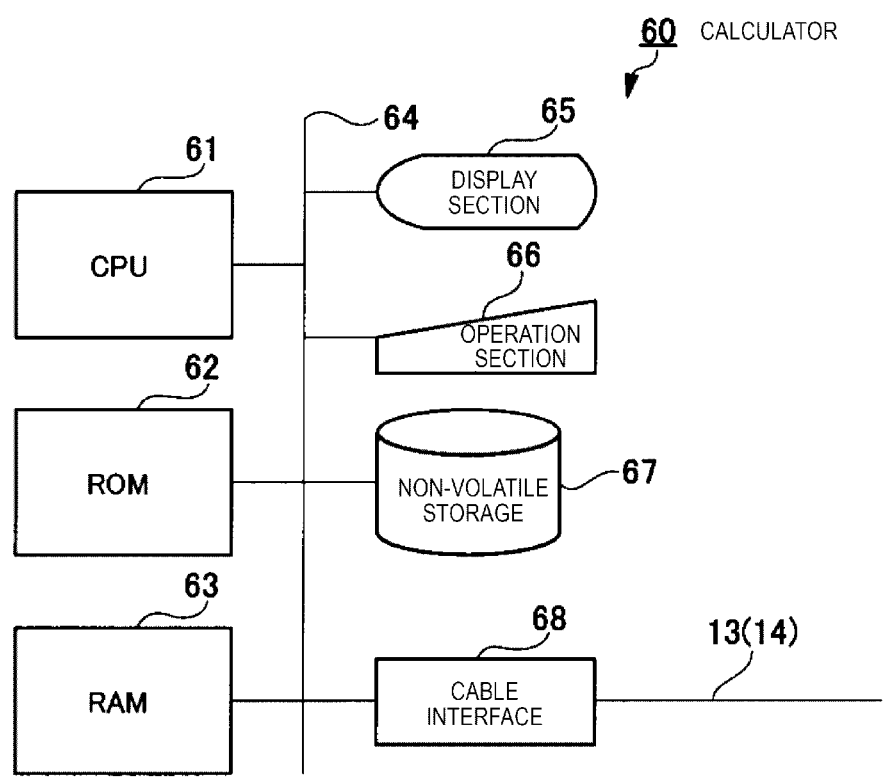

[Fig. 4A]
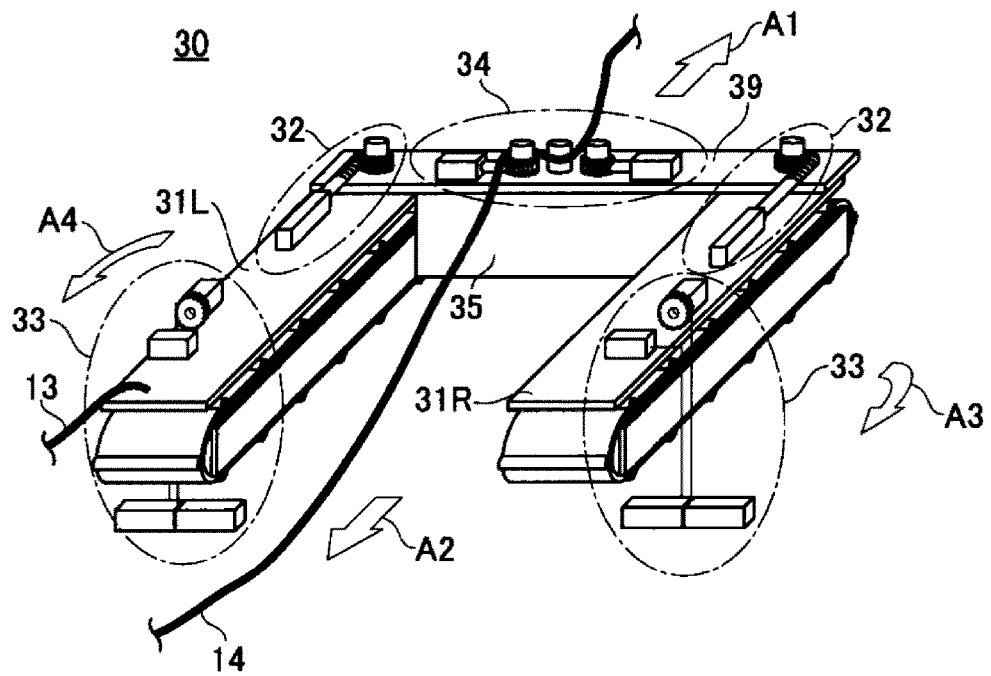
[Fig. 4B]
| OPERATION MODE | LEFT WHEEL CRAWLER | RIGHT WHEEL CRAWLER |
|---|---|---|
| FORWARD (DIRECTION A1) | NORMAL ROTATION | NORMAL ROTATION |
| REARWARD (DIRECTION A2) | REVERSE ROTATION | REVERSE ROTATION |
| RIGHT TURNING (DIRECTION A3) | NORMAL ROTATION | REVERSE ROTATION |
| LEFT TURNING (DIRECTION A4) | REVERSE ROTATION | NORMAL ROTATION |

[Fig. 5A]
[Fig. 5B]
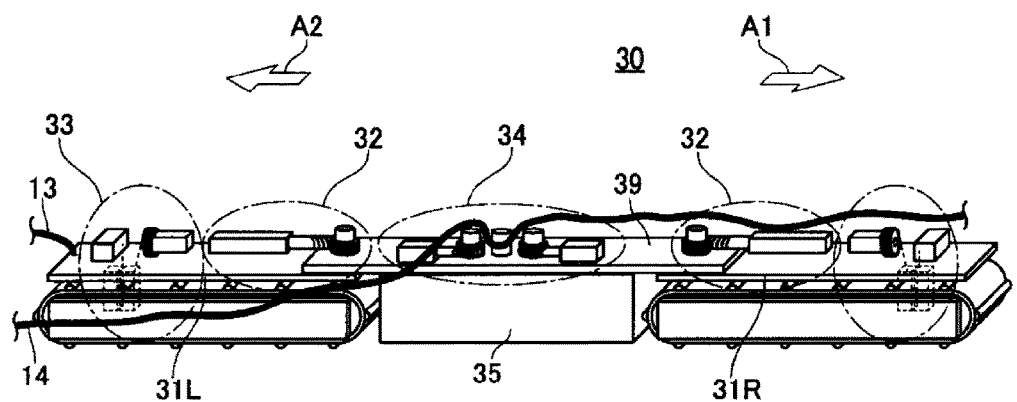
| OPERATION MODE | LEFT WHEEL CRAWLER | RIGHT WHEEL CRAWLER |
|---|---|---|
| FORWARD (DIRECTION A1) | NORMAL ROTATION | REVERSE ROTATION |
| REARWARD (DIRECTION A2) | REVERSE ROTATION | NORMAL ROTATION |

[Fig. 6A]
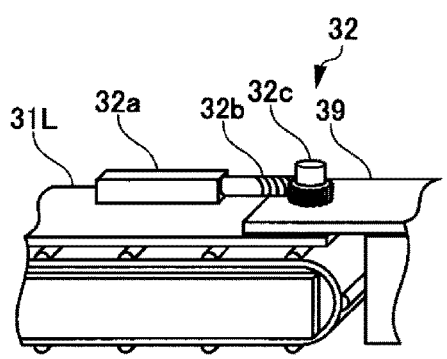
[Fig. 6B]
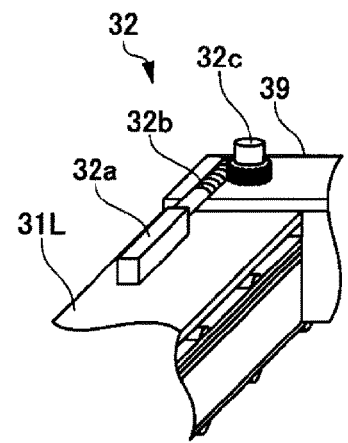
[Fig. 7]
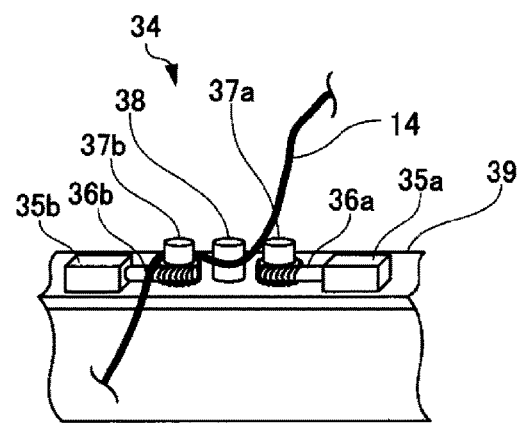

[Fig. 8A]
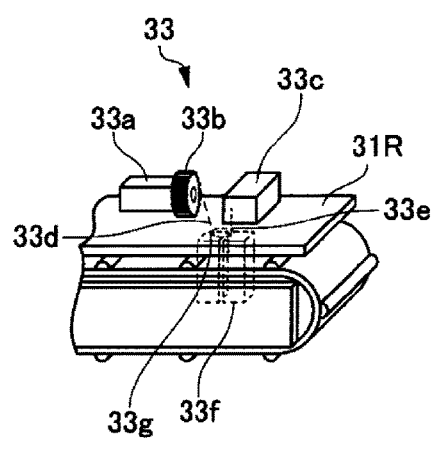
[Fig. 8B]
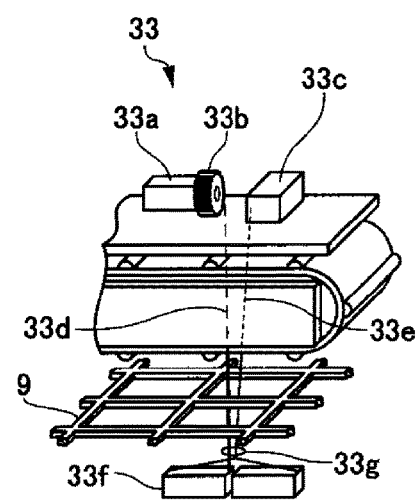

[Fig. 9]
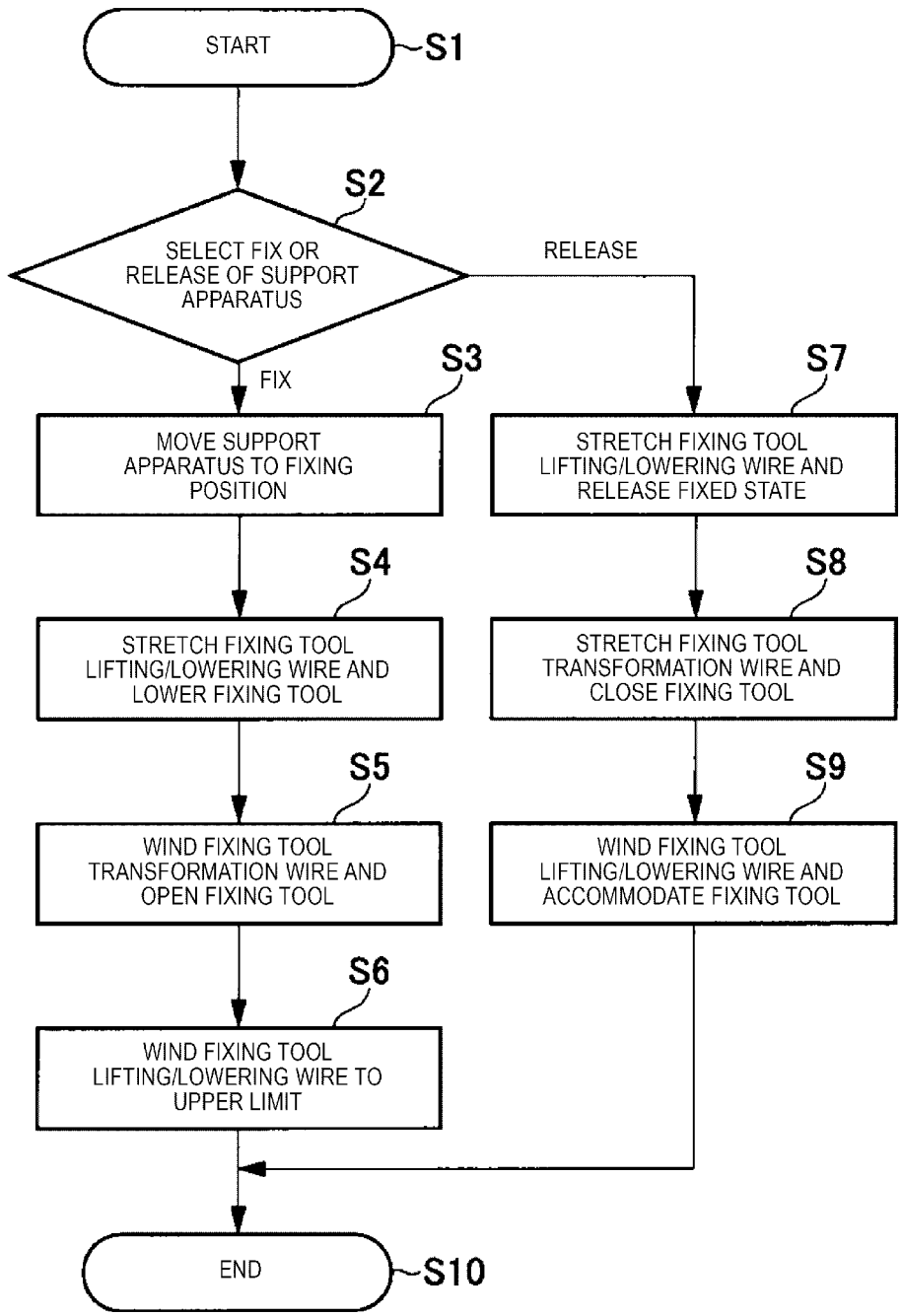

[Fig. 10]
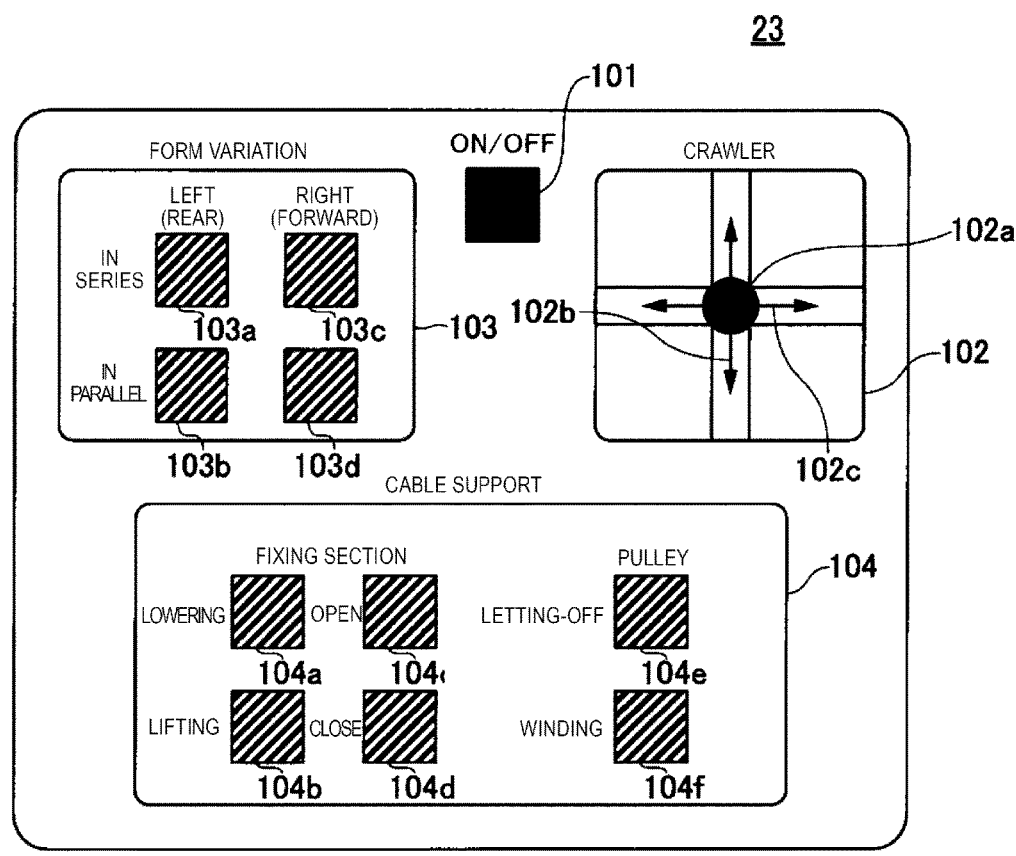

[Fig. 11]
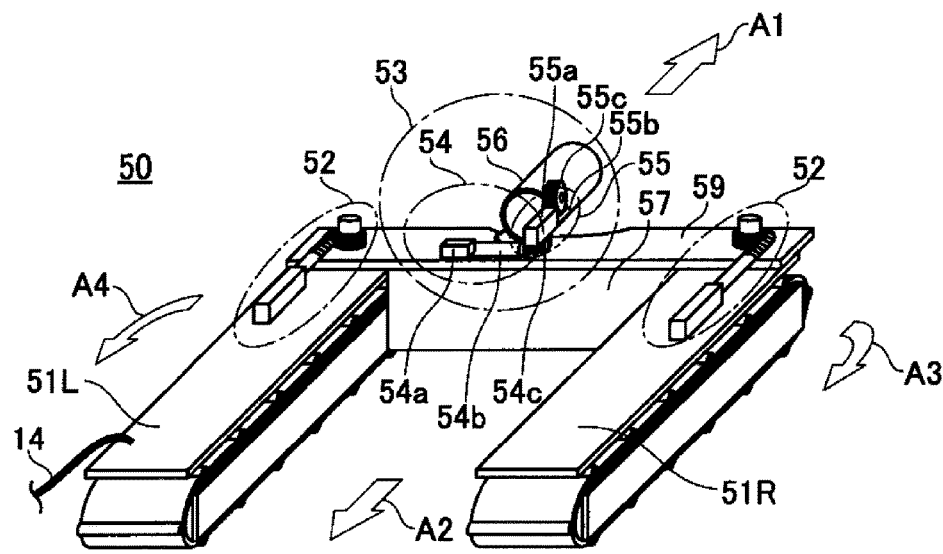
[Fig. 12]
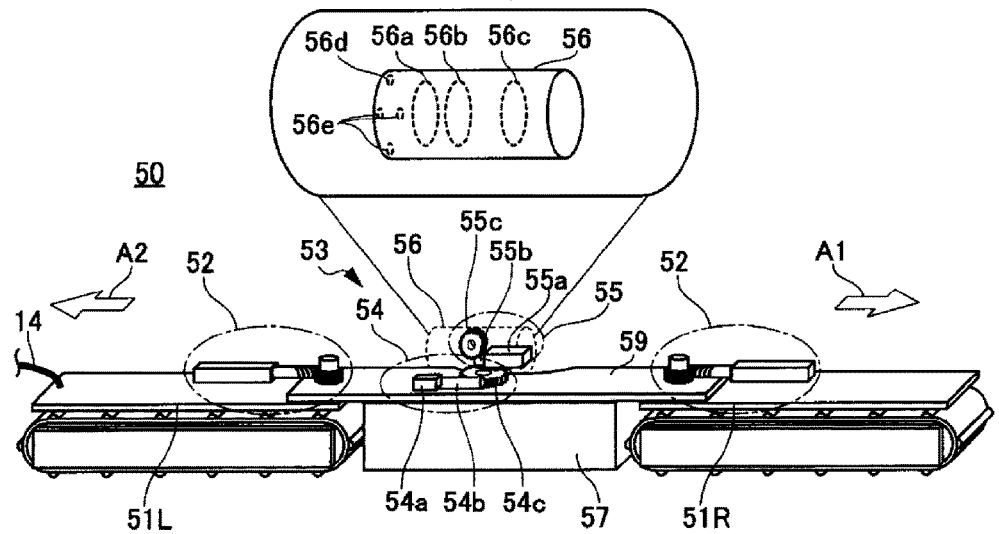

[Fig. 13]
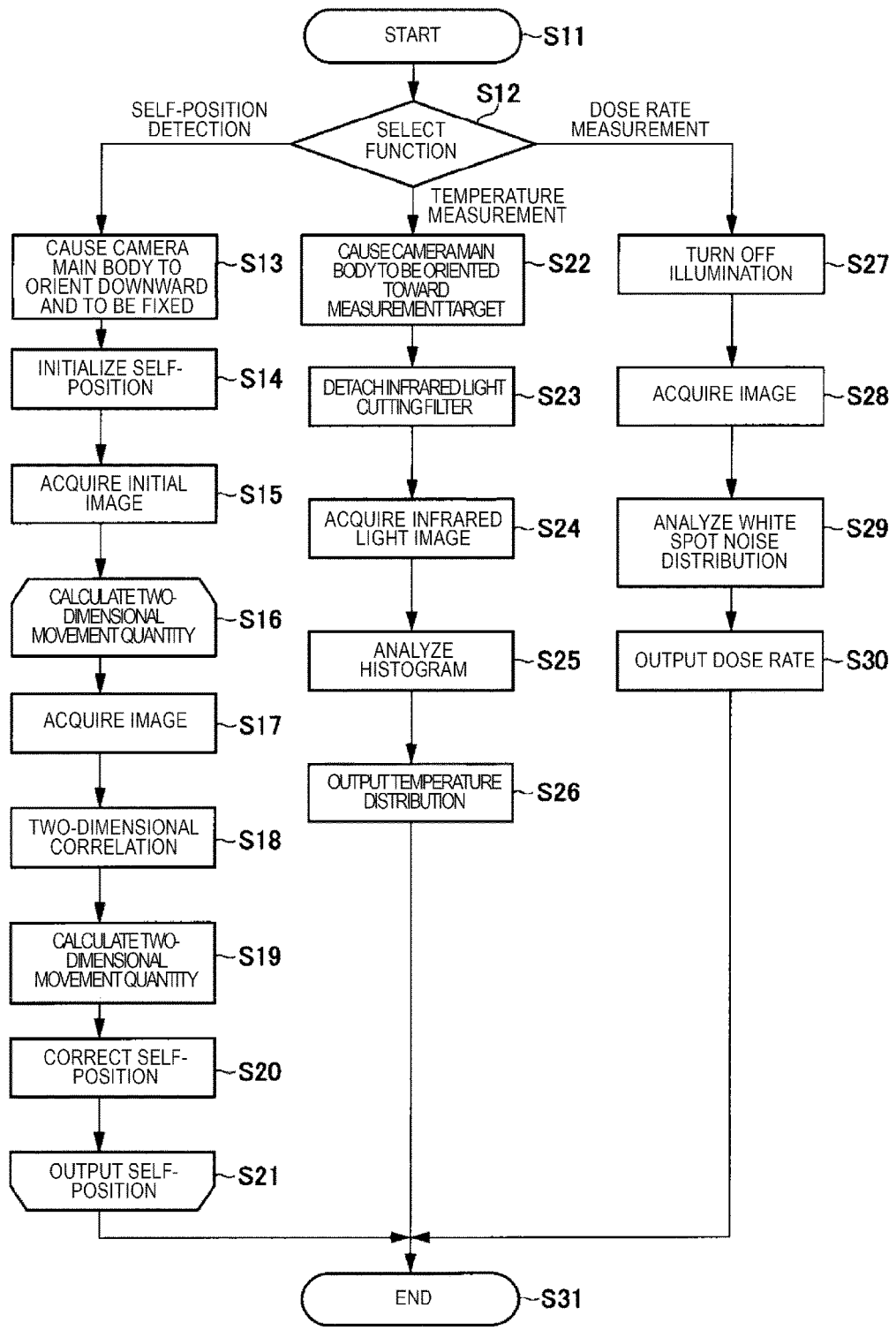

[Fig. 14]
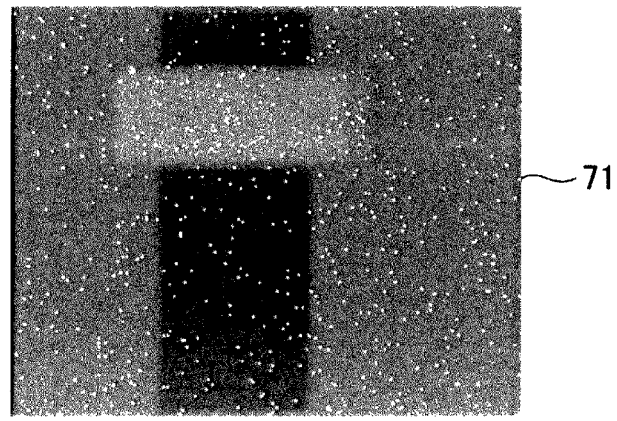
71
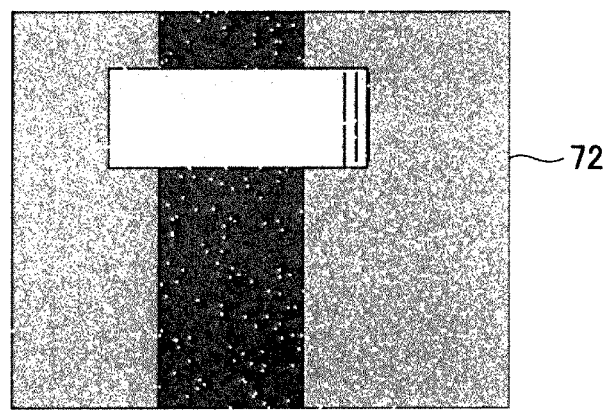
72
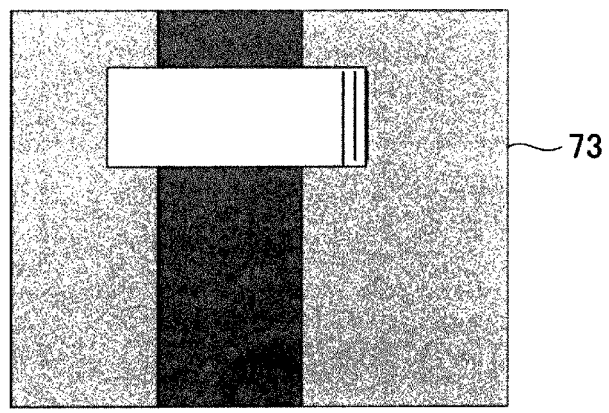
73

[Fig. 15]
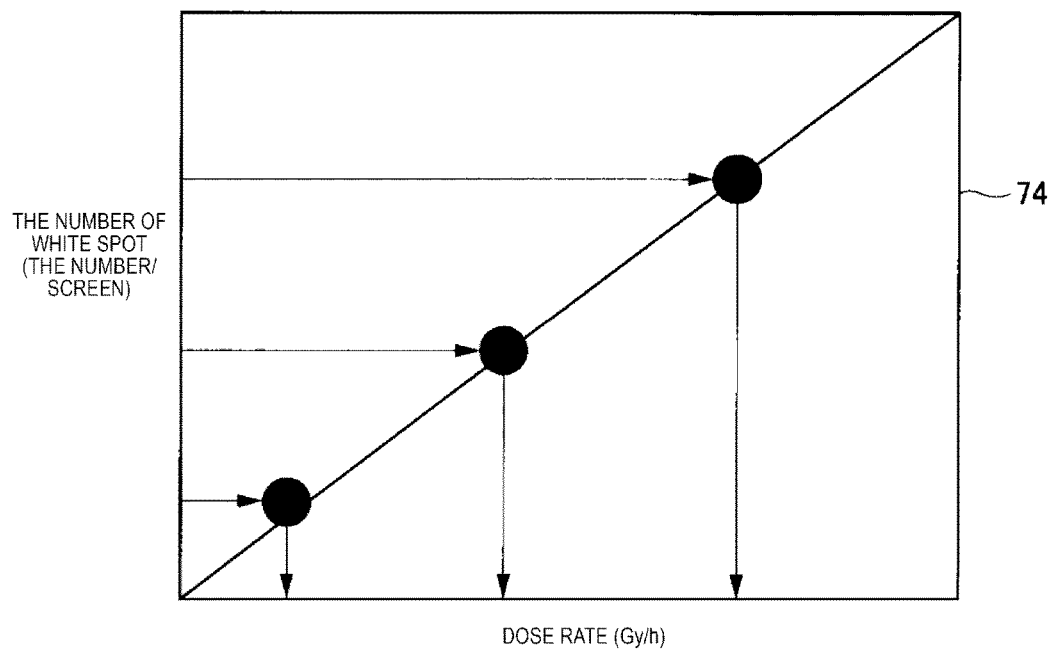

[Fig. 16]
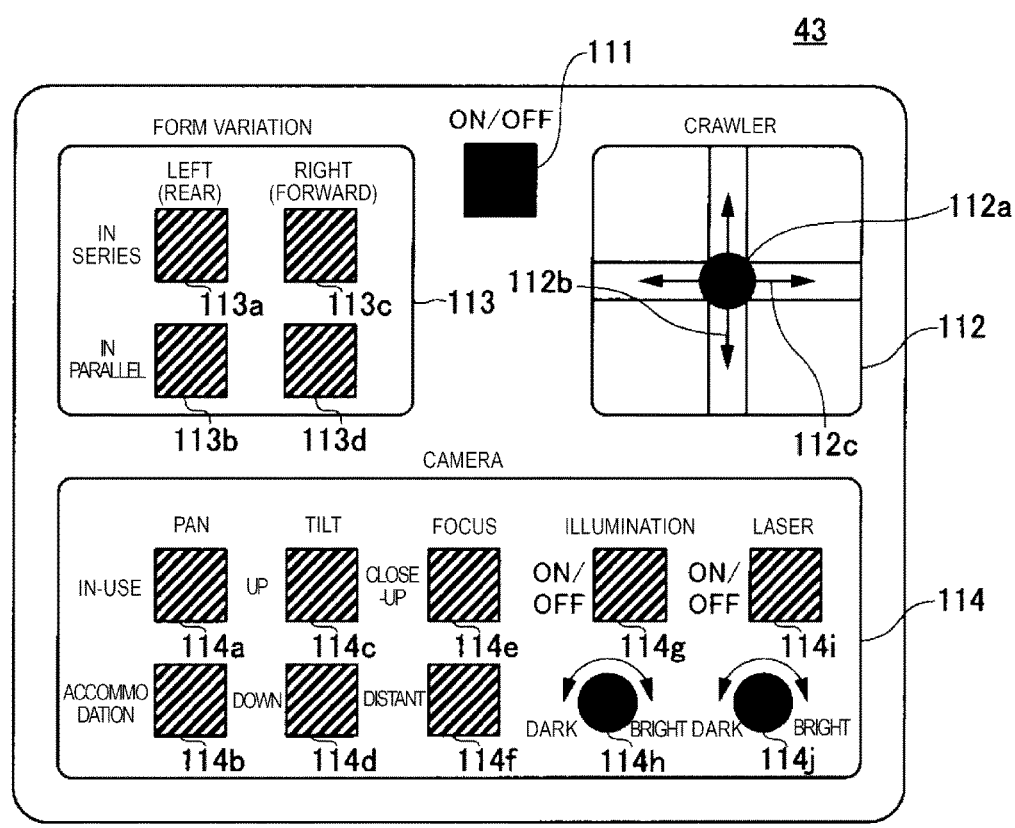

[Fig. 17]
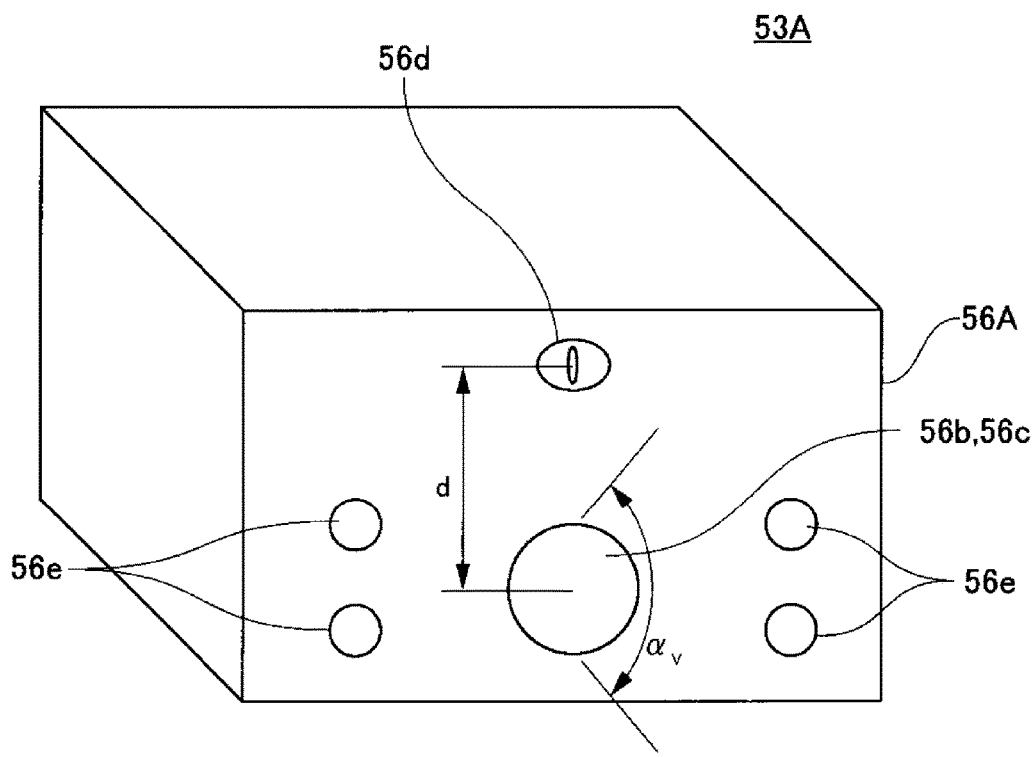

[Fig. 18A]
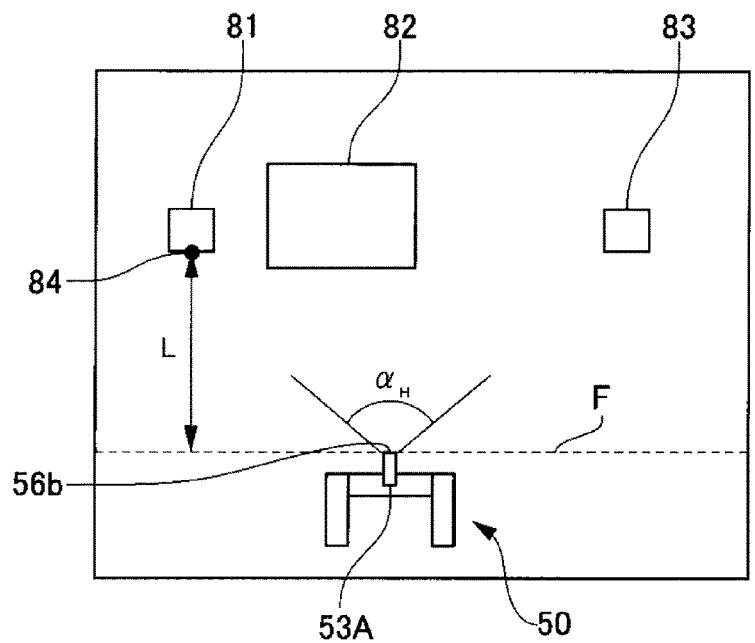
[Fig. 18B]
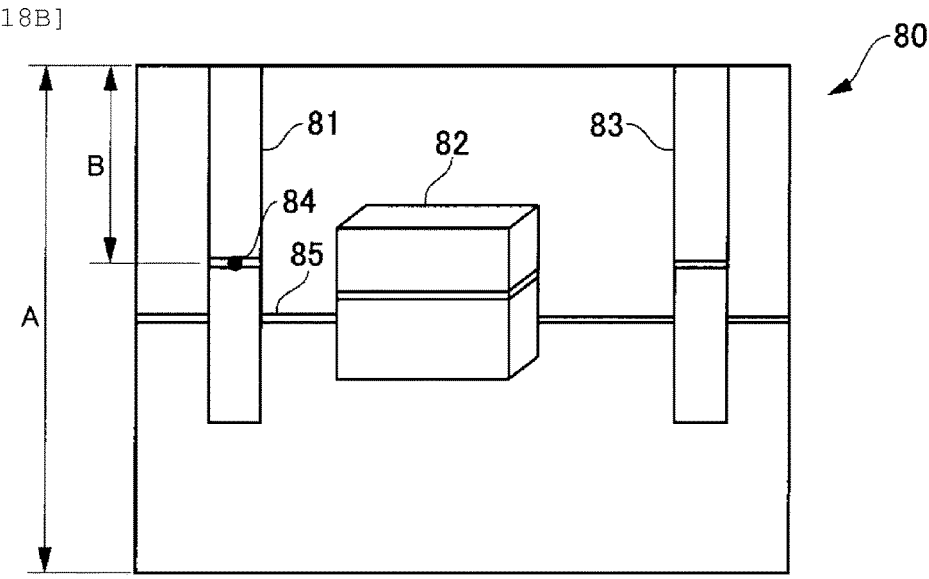

[Fig. 19]
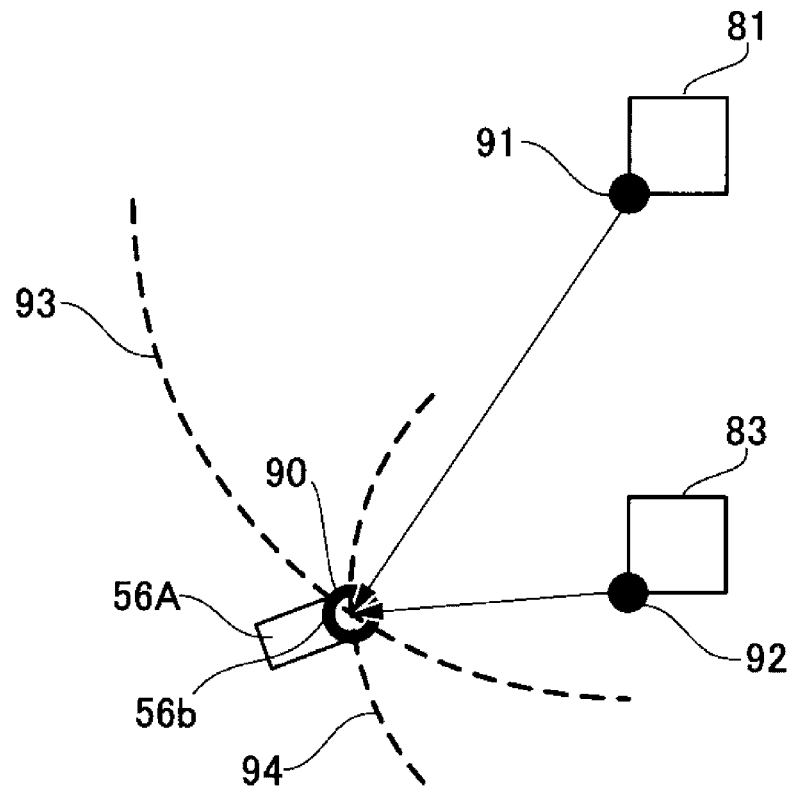
[Fig. 20]
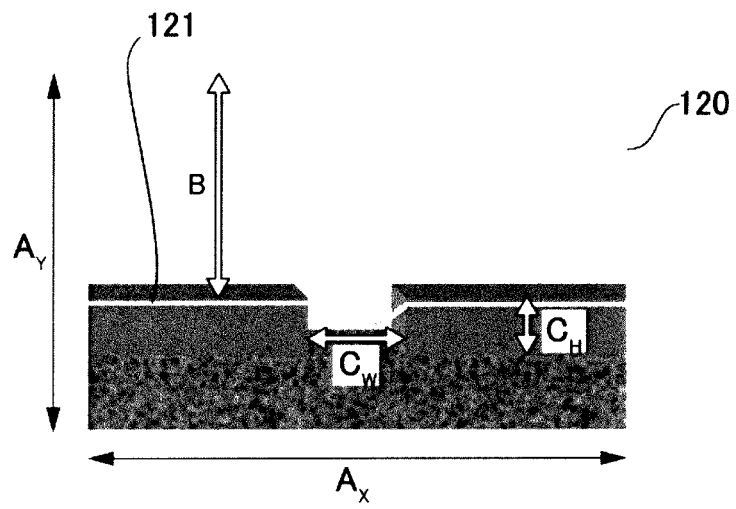

[Fig. 21]
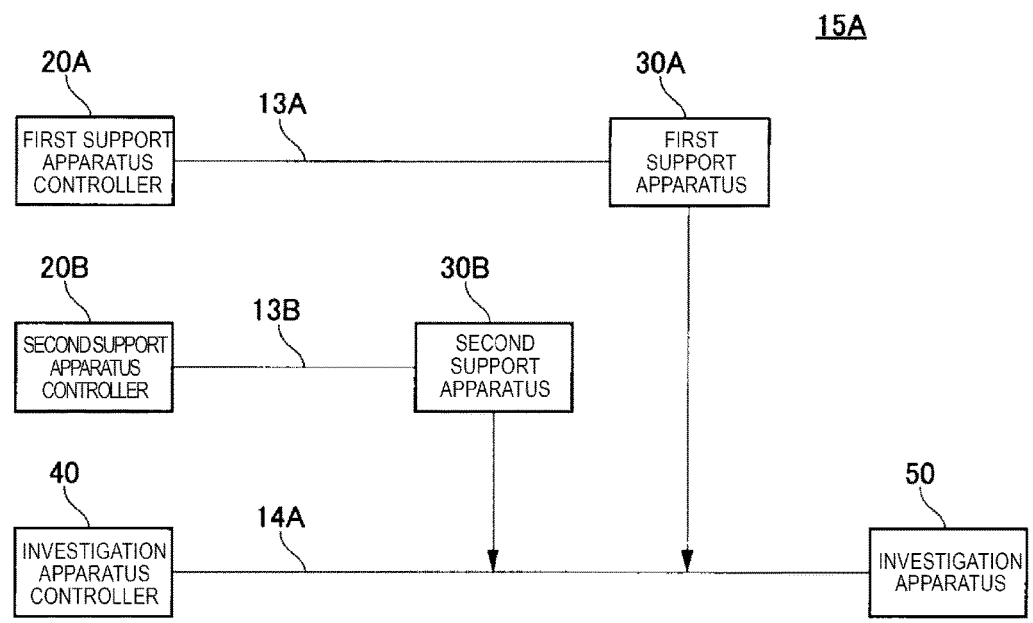

[Fig. 22A]
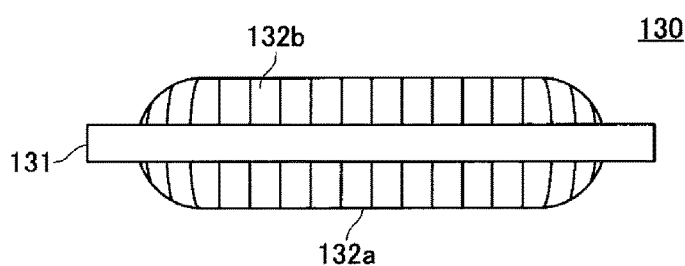
[Fig. 22B]
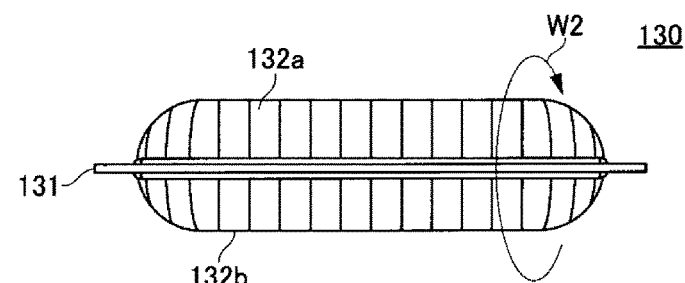
[Fig. 22C]
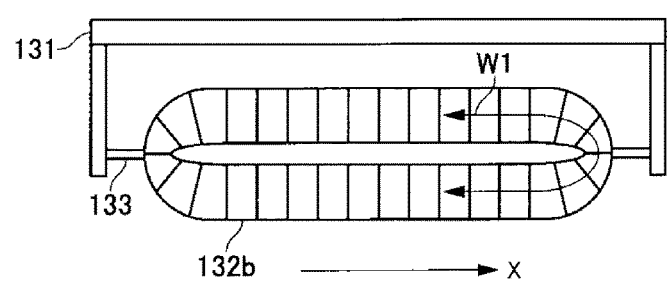
[Fig. 22D]
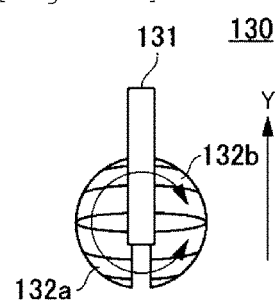

INVESTIGATION SYSTEM

TECHNICAL FIELD

The present invention relates to an investigation system which includes an investigation apparatus performing investigation of a structure, for example.

BACKGROUND ART

Various types of pipes are provided inside structures such as nuclear power plants and industrial plants, which are too narrow for a worker to pass through. In order to investigate the insides of such structures, an investigation apparatus which can be remotely operated by a worker using a controller has been adopted. The investigation apparatus is connected to an externally installed controller through a cable, and performs necessary investigation in accordance with a control command received from the controller via the cable. Then, in order to allow the investigation apparatus to move efficiently inside the structure, for example, an investigation vehicle disclosed in PTL 1 has been proposed.

PTL 1 discloses the investigation vehicle in which a camera and a control substrate are mounted on an upper portion of a rectangular main body in a longitudinal direction and two sets of circular section crawlers that can rotate in two directions are attached to a lower portion of the main body.

CITATION LIST

Patent Literature

[PTL 1] JP-A-2013-113597

SUMMARY OF INVENTION

Technical Problem

However, when internal constitution of a structure is complicated, a cable is likely to come into contact with a floor surface or the cable is likely to be caught by an obstacle. In addition, if a distance through which an investigation apparatus enters the inside of the structure is long, the cable drawn by the investigation apparatus becomes long. Therefore, when the investigation apparatus is no longer able to draw the cable, a movement range of the investigation apparatus is limited. Thus, it is difficult for the investigation apparatus to enter an objective place.

The investigation vehicle disclosed in PTL 1 is also connected through the cable, but the problem of difficulties in drawing the cable is not solved.

The present invention has been made in consideration of such a circumstance, and aims to provide an investigation system in which the investigation apparatus can move in a long distance and perform investigation.

Solution to Problem

An investigation system according to the present invention includes an investigation apparatus and a support apparatus.

The investigation apparatus includes a camera section, an investigation apparatus housing, and a plurality of first traveling sections, and moves to a position where an investigation target is investigated by the plurality of first traveling sections.

The camera section outputs a captured image of the investigation target through a cable for an investigation apparatus. The investigation apparatus housing is provided with the camera section. The plurality of first traveling sections are attached to both ends of the investigation apparatus housing and are disposed in series or in parallel.

The support apparatus includes a support apparatus housing and a plurality of second traveling sections, and moves to a position where letting-off and winding of the cable for an investigation apparatus are performed by the plurality of second traveling sections.

The support apparatus housing is provided with a cable support section which supports letting-off and winding of the cable for an investigation apparatus. The plurality of second traveling sections are attached to both ends of the support apparatus housing and are disposed in series or in parallel.

Advantageous Effects of Invention

According to the present invention, a support apparatus supports letting-off and winding of a cable for an investigation apparatus which is connected to the investigation apparatus, and thus, the investigation apparatus can move within a wide range and perform investigation.

Problems, constitution, and effects other than those described above are clearly described through the descriptions of the following exemplary embodiments.

BRIEF DESCRIPTION OF DRAWINGS

FIG. 1 is a schematic diagram illustrating a state where the inside of a nuclear reactor containment vessel is investigated by using an investigation system in a first exemplary embodiment of the present invention.

FIG. 2 is a block diagram illustrating an example of internal constitution of the investigation system in the first exemplary embodiment of the present invention.

FIG. 3 is a block diagram illustrating an example of hardware constitution of a calculator in the first exemplary embodiment of the present invention.

FIGS. 4A and 4B are a perspective view and an explanatory diagram of an operation illustrating a constitutional example and an operational example of a support apparatus which travels a flat surface in the first exemplary embodiment of the present invention. FIG. 4A illustrates the constitutional example of the support apparatus in which a left wheel crawler and a right wheel crawler are disposed in parallel, and FIG. 4B illustrates the operational example of the left wheel crawler and the right wheel crawler of the support apparatus which travels the flat surface.

FIGS. 5A and 5B are a perspective view and an explanatory diagram of an operation illustrating a constitutional example of the support apparatus which travels a narrow portion in the first exemplary embodiment of the present invention. FIG. 5A illustrates the constitutional example of the support apparatus in which the left wheel crawler and the right wheel crawler are disposed in series, and FIG. 5B illustrates an operational example of the left wheel crawler and the right wheel crawler of the support apparatus traveling the narrow portion.

FIGS. 6A and 6B are enlarged views of a form variation section in the first exemplary embodiment of the present invention. FIG. 6A illustrates an example of the form variation section which is provided in the left wheel crawler disposed in series with respect to a support apparatus housing, and FIG. 6B illustrates an example of the form variation section which is provided in the left wheel crawler disposed in parallel with respect to the support apparatus housing.

FIG. 7 is an enlarged view of a cable support section in the first exemplary embodiment of the present invention.

FIGS. 8A and 8B are enlarged views of a fixing section in the first exemplary embodiment of the present invention. FIG. 8A illustrates a state of the fixing section while the support apparatus is in movement, and FIG. 8B illustrates a state of the fixing section while the support apparatus is being fixed to a grating.

FIG. 9 is a flow chart illustrating an operational example of each portion of the fixing section which is controlled by a support apparatus control section in the first exemplary embodiment of the present invention.

FIG. 10 is a diagram of the appearance illustrating a detailed constitutional example of an operation section which is included in a support apparatus controller in the first exemplary embodiment of the present invention.

FIG. 11 is a perspective view illustrating an external constitutional example of an investigation apparatus which travels the flat surface in the first exemplary embodiment of the present invention.

FIG. 12 is a perspective view illustrating a constitutional example of the investigation apparatus which travels the narrow portion in the first exemplary embodiment of the present invention.

FIG. 13 is a flowchart illustrating contents of processing for each function in investigation performed by an investigation apparatus control section in the first exemplary embodiment of the present invention based on an image which is acquired by a camera section.

FIG. 14 is an explanatory diagram illustrating an example of an image which is displayed by a display section in the first exemplary embodiment of the present invention.

FIG. 15 is an explanatory diagram illustrating an example in which the dose rate measurement section in the first exemplary embodiment of the present invention calculates dose rates based on the number of white spot noises included in an image under an environment where an investigation target is imaged.

FIG. 16 is a diagram of the appearance illustrating a detailed constitutional example of the operation section which is included in an investigation apparatus controller in the first exemplary embodiment of the present invention.

FIG. 17 is a perspective view illustrating a constitutional example of the camera section in a second exemplary embodiment of the present invention.

FIGS. 18A and 18B are explanatory diagrams illustrating an example of a method of measuring a distance from the investigation apparatus to the investigation target in the second exemplary embodiment of the present invention. FIG. 18A illustrates an example of a positional relationship between the investigation apparatus and the investigation target in a top view, and FIG. 18B illustrates an example of a captured image of the investigation target which is irradiated with a slit laser beam.

FIG. 19 is an explanatory diagram illustrating a method of calculating a self-position of the investigation apparatus performed by a self-position detection section in the second exemplary embodiment of the present invention.

FIG. 20 is an explanatory diagram illustrating a method of calculating the height of the investigation target and a gap which exist in the front of the investigation apparatus, performed by the self-position detection section in the second exemplary embodiment of the present invention.

FIG. 21 is a block diagram illustrating an example of internal constitution of the investigation system in a third exemplary embodiment of the present invention.

FIGS. 22A, 22B, 22C and 22D are explanatory diagrams illustrating a structure of a circular section crawler in a fourth exemplary embodiment of the present invention. FIG. 22A is a top view of the circular section crawler, FIG. 22B is a bottom view of the circular section crawler, FIG. 22C is a front view of the circular section crawler, and FIG. 22D is a side view of the circular section crawler.

DESCRIPTION OF EMBODIMENTS

First Exemplary Embodiment

Hereinafter, a constitutional example and an operational example of an investigation system in a first exemplary embodiment of the present invention will be described with reference to FIGS. 1 to 16.

In this specification and the drawings, the same reference numerals and signs will be applied to constitutional elements having substantially the same functions and constitution, and the descriptions thereof will be omitted without being repeated.

<Constitution of Nuclear Reactor Building>

FIG. 1 illustrates a state where the inside of a nuclear reactor containment vessel is investigated by using an investigation system 15.

A nuclear reactor containment vessel 2 is installed inside a nuclear reactor building 1. Then, a nuclear reactor pressure vessel 3 and a pedestal 4 are installed inside the nuclear reactor containment vessel 2. The nuclear reactor pressure vessel 3 is held by the pedestal 4. In addition, a pressure suppression chamber 6 which is installed inside a torus chamber 5 is connected to the nuclear reactor containment vessel 2.

In addition, in the nuclear reactor containment vessel 2, a guide pipe 8 which is a narrow pipe (hereinafter, a narrow part such as the inside of the guide pipe 8 will be referred to as "the narrow portion") is inserted into a penetration portion which is provided in a portion of the nuclear reactor containment vessel 2. In addition, inside the nuclear reactor containment vessel 2, a lattice-shaped grating 9 is installed at a height which is substantially the same as the height of a nuclear reactor building floor 7. An opening section 10 is formed in a portion of the grating 9. A nuclear reactor pressure vessel bottom section 11 is provided at the bottom of the nuclear reactor containment vessel 2. The pedestal 4 which is in the vicinity of the nuclear reactor containment vessel 2 is provided with an opening section 12 through which a worker goes in and out of the inside of the pedestal 4.

The investigation system 15 is used in order to investigate the inside of such a nuclear reactor containment vessel 2. The investigation system 15 includes a support apparatus controller 20, a support apparatus 30, an investigation apparatus controller 40, and an investigation apparatus 50. The support apparatus controller 20 and the investigation apparatus controller 40 are provided outside the nuclear reactor building 1. Meanwhile, the support apparatus 30 and the investigation apparatus 50 enter the inside of the nuclear reactor containment vessel 2.

The support apparatus 30 is connected to the support apparatus controller 20 through a cable 13 for a support apparatus. The investigation apparatus 50 is connected to the investigation apparatus controller 40 through a cable 14 for an investigation apparatus. During investigation of the nuclear reactor containment vessel 2, entry of the investigation apparatus 50 and the support apparatus 30 is carried out in order through the guide pipe 8 toward the inside of the nuclear reactor containment vessel 2. The investigation apparatus 50 and the support apparatus 30 are lowered to the grating 9 in order from the end portion of the guide pipe 8 inside the nuclear reactor containment vessel 2. Then, the support apparatus 30 is fixed onto the grating 9, thereby supporting letting-off and winding of the cable 14 for an investigation apparatus. The investigation apparatus 50 is lowered to the nuclear reactor pressure vessel bottom section 11 through the opening section 10, and the investigation apparatus 50 moves on the nuclear reactor pressure vessel bottom section 11, thereby performing predetermined investigation.

When investigation of the inside of the nuclear reactor containment vessel 2 is completed, the support apparatus 30 and the investigation apparatus 50 return to the end portion of the guide pipe 8. Then, the support apparatus 30 and the investigation apparatus 50 are pulled up in order through the guide pipe 8 by a winch which is provided outside the nuclear reactor building 1. Thereafter, the support apparatus 30 and the investigation apparatus 50 travel the inside of the guide pipe 8 and exit from the nuclear reactor containment vessel 2 and the nuclear reactor building 1, thereby being collected by a worker.

<Constitutional Example of Investigation System>

FIG. 2 illustrates an example of internal constitution of the investigation system 15.

The support apparatus controller 20 includes a display section 21, a support apparatus control section 22, and an operation section 23. Then, the support apparatus controller 20 controls an operation of the support apparatus 30 via the cable 13 for a support apparatus.

The display section 21 displays an operational state of each section in the support apparatus 30, a movement distance of the support apparatus 30, and the like.

The support apparatus control section 22 controls an operation of the support apparatus 30 and causes the display section 21 to display the state and the like of the support apparatus 30 based on an operational input from the operation section 23.

The operation section 23 receives an operational input from a worker for causing the support apparatus 30 to perform a predetermined operation.

The support apparatus 30 includes a traveling section 31 (an example of a second traveling section), a form variation section 32, a fixing section 33, and a cable support section 34.

The traveling section 31 is constituted of a left wheel crawler 31L and a right wheel crawler 31R (refer to FIGS. 4A, 4B, 5A and 5B described below). Each of the crawlers rotates normally and reversely so as to move the support apparatus 30 in an arbitrary direction. Then, the support apparatus 30 moves to a position where letting-off and winding of the cable 14 for an investigation apparatus are performed, by the traveling section 31.

The form variation section 32 causes each of the crawlers of the support apparatus 30 to be disposed in parallel when a place where the support apparatus 30 travels is a flat surface (refer to FIG. 4A described below), and causes each of the crawlers of the support apparatus 30 to be disposed in series when the place is the narrow portion (refer to FIG. 5A described below).

The fixing section 33 fixes the support apparatus 30 to the grating 9. This fixing position becomes the position where letting-off and winding of the cable 14 for an investigation apparatus are performed by the support apparatus 30.

The cable support section 34 supports letting-off and winding of the cable 14 for an investigation apparatus.

The investigation apparatus controller 40 includes a display section 41, an investigation apparatus control section 42, and an operation section 43. Then, the investigation apparatus controller 40 controls an operation of the investigation apparatus 50 via the cable 14 for an investigation apparatus.

The display section 41 displays an operational state of each section in the investigation apparatus 50, a movement distance of the investigation apparatus 50, an image captured by a camera section 53 in the investigation apparatus 50, and the like.

The investigation apparatus control section 42 performs predetermined investigation based on an image which is acquired by the camera section 53 through the cable 14 for an investigation apparatus. Therefore, the investigation apparatus control section 42 controls operations of a traveling section 51 (an example of a first traveling section), a form variation section 52, and the camera section 53 of the investigation apparatus 50. For example, the investigation apparatus control section 42 controls an operation of the investigation apparatus 50 based on an operational input from the operation section 43, and causes the display section 41 to display a state and the like of the investigation apparatus 50.

The operation section 43 receives an operational input from a worker for causing the investigation apparatus 50 to perform a predetermined operation.

The investigation apparatus control section 42 includes a self-position detection section 42a, a temperature measurement section 42b, and a dose rate measurement section 42c.

The self-position detection section 42a detects a current position of the investigation apparatus 50.

The temperature measurement section 42b measures the temperature of an investigation target.

The dose rate measurement section 42c measures a radiation dose rate (hereinafter, abbreviated to "the dose rate") under an environment where the investigation target exists.

A detailed example of processing of each function of the self-position detection section 42a, the temperature measurement section 42b, and the dose rate measurement section 42c will be illustrated in FIG. 13 described below.

The investigation apparatus 50 includes the traveling section 51, the form variation section 52, and the camera section 53.

Similar to the traveling section 31 described above, the traveling section 51 is constituted of a left wheel crawler 51L and a right wheel crawler 51R (refer to FIGS. 11 and 12 described below). Each of the crawlers rotates normally and reversely so as to move the investigation apparatus 50 in an arbitrary direction. Then, the investigation apparatus 50 moves to a position where the investigation target is investigated, by the traveling section 51.

Similar to the form variation section 32 described above, the form variation section 52 causes each of the crawlers of the investigation apparatus 50 to be disposed in parallel when a place where the investigation apparatus 50 travels is the flat surface (refer to FIG. 11 described below), and causes each of the crawlers of the investigation apparatus 50 to be disposed in series when the place is the narrow portion (refer to FIG. 12 described below).

The camera section 53 can image the investigation target in a moving image or a still image (hereinafter, will be generically called "the image") by using visible rays including infrared light or visible rays not including infrared light. Then, the camera section 53 outputs the captured image of the investigation target through the cable 14 for an investigation apparatus. The investigation apparatus control section 42 receives the image from the camera section 53 via the cable 14 for an investigation apparatus.

The support apparatus 30 and the investigation apparatus 50 in the present exemplary embodiment are not electrically connected to each other. However, it is possible to transceive a signal which is necessary between the support apparatus 30 and the investigation apparatus 50 by integrating the cable 13 for a support apparatus and the cable 14 for an investigation apparatus with each other and by dividing a signal inside the support apparatus 30.

<Example of Hardware Constitution of Calculator>

Subsequently, descriptions will be given regarding an example of hardware constitution of a calculator 60 constituting the support apparatus controller 20 and the investigation apparatus controller 40.

FIG. 3 illustrates the example of the hardware constitution of the calculator 60.

The calculator 60 is hardware which is used as a so-called computer. The calculator 60 includes a central processing unit (CPU) 61, a read only memory (ROM) 62, and a random access memory (RAM) 63 which are individually connected to a bus 64. Moreover, the calculator 60 includes a display section 65, an operation section 66, a non-volatile storage 67, and a cable interface 68.

The CPU 61 reads out a program code of software for realizing each function of the present exemplary embodiment from the ROM 62, thereby executing the program code. In the RAM 63, variables, parameters, and the like generated in the midst of computation processing are temporarily written. Each of the functions of the support apparatus control section 22 and the investigation apparatus control section 42 illustrated in FIG. 2 is realized through the CPU 61. In FIG. 2, constitution corresponding to the ROM 62 and the RAM 63 is not illustrated.

For example, the display section 65 is a liquid crystal display monitor and displays results of processing and the like performed by the calculator 60 for a worker. For example, a keyboard, a joystick, button switches, and the like are used as the operation section 66 so as to allow a worker to perform predetermined operational inputs and instructions. The display section 65 corresponds to the display sections 21 and illustrated in FIG. 2, and the operation section 66 corresponds to the operation sections 23 and 43 illustrated in FIG. 2.

As the non-volatile storage 67, for example, a hard disk drive (HDD), a flexible disk, an optical disk, a magneto-optical disk, a CD-ROM, a CD-R, a magnetic tape, a non-volatile memory card, and the like are used. In the non-volatile storage 67, a program for operating the calculator 60 is recorded in addition to an operation system (OS) and various types of parameters. As the cable interface 68, for example, a network interface card (NIC) and the like are used. In the support apparatus controller 20, the cable 13 for a support apparatus is connected to the cable interface 68 so as to allow various types of data to be transceived between the support apparatus controller 20 and the support apparatus 30. In the investigation apparatus controller 40, the cable 14 for an investigation apparatus is connected to the cable interface 68 so as to allow various types of data to be transceived between the investigation apparatus controller 40 and the investigation apparatus 50. In FIG. 2, constitution corresponding to the non-volatile storage 67 and the cable interface 68 is not illustrated.

<Shape of Support Apparatus Traveling Flat Surface>

Subsequently, descriptions will be given regarding a constitutional example and an operational example of the support apparatus 30, differentially in a case where the support apparatus 30 travels the flat surface and a case where the support apparatus 30 travels the narrow portion.

FIGS. 4A and 4B illustrate the constitutional example and the operational example of the support apparatus 30 which travels the flat surface. FIG. 4A illustrates the constitutional example of the support apparatus 30 in which the left wheel crawler 31L and the right wheel crawler 31R are disposed in parallel, and FIG. 4B illustrates the operational example of the left wheel crawler 31L and the right wheel crawler 31R of the support apparatus 30 which travels the flat surface.

The support apparatus 30 transforms the left wheel crawler 31L and the right wheel crawler 31R described below and illustrated in FIG. 5A from a disposition in series to a disposition in parallel when traveling the flat surface while moving on the grating 9. Here, an arrow A1 represents a forward direction of the support apparatus 30, and an arrow A2 represents a rearward direction of the support apparatus 30. In addition, an arrow A3 represents a right-turning direction of the support apparatus 30, and an arrow A4 represents a left-turning direction of the support apparatus 30.

The support apparatus 30 includes a substantially rectangular parallelepiped support apparatus housing 35, and the left wheel crawler 31L and the right wheel crawler 31R which are respectively attached to both ends of the support apparatus housing 35. The support apparatus housing 35 includes a placement plate 39 in which various types of components are placed. The placement plate 39 has a substantially rectangular shape, and both ends thereof protrude in a longitudinal direction of the support apparatus housing 35. The form variation section 32 and the cable support section 34 are provided on the placement plate 39. The constitutional example and the operational example of the form variation section 32 and the cable support section 34 will be described below.

The left wheel crawler 31L and the right wheel crawler 31R are attached to the support apparatus housing 35 via the form variation section 32. Then, the left wheel crawler 31L and the right wheel crawler 31R are used as an example of the traveling section 31. The support apparatus 30 travels in a rotary direction (in one direction) of the left wheel crawler 31L and the right wheel crawler 31R. A plurality of grousers are provided in the left wheel crawler 31L and the right wheel crawler 31R so as to be oriented outward for slip prevention. Attachment angles of the left wheel crawler 31L and the right wheel crawler 31R with respect to the support apparatus housing 35 in the longitudinal direction can vary by the form variation section 32. Then, the left wheel crawler 31L and the right wheel crawler 31R are disposed in series or in parallel by the form variation section 32.

In addition, the fixing section 33 is provided above each of the left wheel crawler 31L and the right wheel crawler 31R. The constitutional example and the operational example of the fixing section 33 will be described below.

Then, one end of the cable 13 for a support apparatus is connected to the left wheel crawler 31L.

FIG. 4B is a synoptic table of an operation mode when the support apparatus 30 travels the flat surface, and the rotary direction of the left wheel crawler 31L and the right wheel crawler 31R. As shown in the synoptic table, when both of the left wheel crawler 31L and the right wheel crawler 31R rotate normally, the support apparatus 30 precedes forward in an arrow A1 direction. When both of the left wheel crawler 31L and the right wheel crawler 31R rotate reversely, the support apparatus 30 precedes rearward in an arrow A2 direction. In addition, when the left wheel crawler 31L rotates normally and the right wheel crawler 31R rotates reversely, the support apparatus 30 turns to the right in an arrow A3 direction. Moreover, when the left wheel crawler 31L rotates reversely and the right wheel crawler 31R rotates normally, the support apparatus 30 turns to the left in an arrow A4 direction.

<Shape of Support Apparatus Traveling Narrow Portion>

FIGS. 5A and 5B illustrate the constitutional example and the operational example of the support apparatus 30 which travels the narrow portion. FIG. 5A illustrates the constitutional example of the support apparatus 30 in which the left wheel crawler 31L and the right wheel crawler 31R are disposed in series, and FIG. 5B illustrates the operational example of the left wheel crawler 31L and the right wheel crawler 31R of the support apparatus 30 which travels the narrow portion.

The support apparatus 30 transforms the left wheel crawler 31L and the right wheel crawler 31R from a disposition in parallel illustrated in FIG. 4A to a disposition in series illustrated in FIG. 5A when moving in the narrow portion.

FIG. 5B is a synoptic table of an operation mode when the support apparatus 30 travels the narrow portion, and the rotary direction of the left wheel crawler 31L and the right wheel crawler 31R. As shown in the synoptic table, when the left wheel crawler 31L rotates normally and the right wheel crawler 31R rotates reversely, the support apparatus 30 precedes forward in the arrow A1 direction. When the left wheel crawler 31L rotates reversely and the right wheel crawler 31R rotates normally, the support apparatus 30 precedes rearward in the arrow A2 direction.

<Constitutional Example and Operational Example of Form Variation Section>

Subsequently, with reference to FIG. 6, descriptions will be given regarding a constitutional example and an operational example of the form variation section 32.

FIGS. 6A and 6B are enlarged views of the form variation section 32. FIG. 6A illustrates an example of the form variation section 32 which is provided in the left wheel crawler 31L disposed in series with respect to the support apparatus housing 35, and FIG. 6B illustrates an example of the form variation section 32 which is provided in the left wheel crawler 31L disposed in parallel with respect to the support apparatus housing 35. Here, descriptions will be given regarding the form variation section 32 which is provided in the left wheel crawler 31L.

The form variation section 32 includes a motor 32a for form variation, a worm gear 32b for form variation, and a gear attached shaft 32c.

The motor 32a for form variation is attached onto the left wheel crawler 31L. The worm gear 32b for form variation is connected to the motor 32a for form variation along a rotary shaft of the motor 32a for form variation. Then, the gear attached shaft 32c is attached onto the placement plate 39. The gear attached shaft 32c is fixed to both ends of the placement plate 39.

When the rotary shaft of the motor 32a for form variation rotates normally, the worm gear 32b for form variation rotates in the same direction as the rotary direction of the rotary shaft of the motor 32a for form variation. Then, the gear attached shaft 32c rotates in a direction perpendicular to the rotary direction of the worm gear 32b for form variation. Accordingly, as seen from FIG. 6A to FIG. 6B, a connection angle of the left wheel crawler 31L with respect to the support apparatus housing 35 in the longitudinal direction varies. Meanwhile, as seen from FIG. 6B to FIG. 6A, when the rotary shaft of the motor 32a for form variation rotates reversely, the connection angle of the left wheel crawler 31L with respect to the support apparatus housing 35 in the longitudinal direction varies. The same constitution and operations are applied to the form variation section 32 provided in the right wheel crawler 31R.

<Constitutional Example and Operational Example of Cable Support Section>

Subsequently, with reference to FIG. 7, descriptions will be given regarding a constitutional example and an operational example of the cable support section 34.

FIG. 7 is an enlarged view of the cable support section 34.

The support apparatus 30 includes an active pulley 37a for feeding a cable, a passive pulley 38, and an active pulley 37b for winding a cable which are disposed on the placement plate 39 in a substantially linear manner. The active pulley 37a for feeding a cable is driven by a motor 35a for feeding a cable and a worm gear 36a for feeding a cable. The active pulley 37b for winding a cable is driven by a motor 35b for winding a cable and a worm gear 36b for winding a cable. The active pulley 37a for feeding a cable, the active pulley 37b for winding a cable, and the passive pulley 38 interpose the cable 14 for an investigation apparatus thereamong. Then, the active pulley 37a for feeding a cable, the active pulley 37b for winding a cable, and the passive pulley 38 perform letting-off and winding of the cable 14 for an investigation apparatus in association with one another.

Subsequently, descriptions will be given regarding a detailed operational example of each of the pulleys.

When the support apparatus 30 performs feeding of the cable 14 for an investigation apparatus on the investigation apparatus 50 side, the motor 35a for feeding a cable rotates the worm gear 36a for feeding a cable. Accordingly, the active pulley 37a for feeding a cable coming into contact with the worm gear 36a for feeding a cable rotates. A portion of the cable 14 for an investigation apparatus is in close contact with the active pulley 37a for feeding a cable. The cable 14 for an investigation apparatus is fed in accordance with turning of the active pulley 37a for feeding a cable.

When the support apparatus 30 performs winding of the cable 14 for an investigation apparatus on the investigation apparatus controller 40 side, the motor 35b for winding a cable rotates the worm gear 36b for winding a cable. Accordingly, the active pulley 37b for winding a cable coming into contact with the worm gear 36b for winding a cable rotates. A portion of the cable 14 for an investigation apparatus is in close contact with the active pulley 37b for winding a cable. The cable 14 for an investigation apparatus is wound in accordance with turning of the active pulley 37b for winding a cable.

In this manner, the cable support section 34 performs letting-off and winding of the cable 14 for an investigation apparatus by rotating two motors 35a for feeding a cable normally and reversely.

The passive pulley 38 presses the cable 14 for an investigation apparatus against a side surface of the active pulley 37a for feeding a cable and a side surface of the active pulley 37b for winding a cable. Accordingly, the cable 14 for an investigation apparatus is unlikely to slide with no traction on the active pulley 37a for feeding a cable and the active pulley 37b for winding a cable. In addition, the passive pulley 38 is attached in order to buffer a force applied to the cable 14 for an investigation apparatus. By using the passive pulley 38 in this manner, the support apparatus 30 can stably feed the cable 14 for an investigation apparatus.

In FIG. 4A, even though portions of the active pulley 37a for feeding a cable, the active pulley 37b for winding a cable, and the passive pulley 38 with which the cable 14 for an investigation apparatus comes into contact are illustrated in columnar shapes, a side surface portion of each of the pulleys may have an inwardly recessed shape. In pulleys having such shapes, a contact area between the recessed side surface portion of each pulley and the side surface of the cable 14 for an investigation apparatus is widened. Thus, a friction force between the side surface portion of each pulley and the side surface of the cable 14 for an investigation apparatus increases. Therefore, the cable 14 for an investigation apparatus is unlikely to slide with no traction on each of the pulleys.

In addition, a cover which covers the cable support section 34 in its entirety can be provided in the placement plate 39 so as to prevent the cable 14 for an investigation apparatus from being deviated from each of the pulleys.

<Constitutional Example and Operational Example of Fixing Section 33>

Subsequently, with reference to FIGS. 8A, 8B and 9, descriptions will be given regarding a constitutional example and an operational example of the fixing section 33 which is attached to the right wheel crawler 31R.

FIGS. 8A and 8B are enlarged views of the fixing section 33. FIG. 8A illustrates a state of the fixing section 33 while the support apparatus 30 is in movement, and FIG. 8B illustrates a state of the fixing section 33 while the support apparatus 30 is being fixed to the grating 9.

The fixing section 33 includes a fixing tool lifting/lowering motor 33a, a fixing tool lifting/lowering drum 33b, a fixing tool transformation motor 33c, a fixing tool lifting/lowering wire 33d, a fixing tool transformation wire 33e, a fixing tool 33f, and a fixing tool transformation instruction ring 33g.

The fixing tool lifting/lowering drum 33b is attached to the rotary shaft of the fixing tool lifting/lowering motor 33a. The fixing tool lifting/lowering wire 33d is wound around the fixing tool lifting/lowering drum 33b, thereby lifting or lowering the fixing tool 33f in accordance with driving of the fixing tool lifting/lowering motor 33a. In addition, the fixing tool transformation motor 33c performs feeding or winding of the fixing tool lifting/lowering wire 33d. The fixing tool 33f is formed with two rod-shaped substances. The fixing tool lifting/lowering wire 33d is connected to one end (a fulcrum portion at which the fixing tool 33f is open and closed) of the fixing tool 33f, and the fixing tool transformation wire 33e is connected to the other end of the fixing tool 33f. Moreover, the one end of the fixing tool 33f is provided with the fixing tool transformation instruction ring 33g. The fixing tool lifting/lowering wire 33d and the fixing tool trans formation wire 33e communicate with each other through the inside of the fixing tool transformation instruction ring 33g.

FIG. 9 illustrates the operational example of each portion of the fixing section 33 which is controlled by the support apparatus control section 22.

The support apparatus control section 22 starts processing for selecting whether to fix the support apparatus 30 to the grating 9 by using the fixing section 33 or to release the fixed fixing section 33 (S1). Then, the support apparatus control section 22 selects whether to fix or release the support apparatus 30 in accordance with an operational input from the operation section 23 (S2).

When the operation section 23 selects to fix the support apparatus 30, the support apparatus control section 22 moves the support apparatus 30 to a predetermined position of the grating 9 (S3). Then, the support apparatus control section 22 drives the fixing tool lifting/lowering motor 33a and stretches the fixing tool lifting/lowering wire 33d by rotating the fixing tool lifting/lowering drum 33b, thereby lowering the fixing tool 33f to a lower surface of the grating 9 (S4).

In this case, the fixing tool 33f is lifted and lowered in a closed state (the state illustrated in FIG. 8A). The width of the closed fixing tool 33f in a horizontal direction is narrower than the width of a gap of the grating 9. Therefore, the fixing tool 33f is likely to pass through the gap of the grating 9. The support apparatus control section 22 stops rotations of the fixing tool lifting/lowering drum 33b as the fixing tool 33f is lowered to the lower surface of the grating 9.

Subsequently, the support apparatus control section 22 drives the fixing tool transformation motor 33c, and the fixing tool transformation wire 33e is wound around the rotary shaft of the fixing tool transformation motor 33c (S5). In this case, the fixing tool transformation wire 33e moves inside the fixing tool transformation instruction ring 33g, and as illustrated in FIG. 8B, the fixing tool 33f is open. In FIG. 8B, the right wheel crawler 31R is in a state of floating from the grating 9 in order to illustrate the relationship between the grating 9 and the fixing tool 33f, the right wheel crawler 31R is actually in contact with an upper surface of the grating 9.

Then, the support apparatus control section 22 drives the fixing tool lifting/lowering motor 33a and rotates the fixing tool lifting/lowering drum 33b reversely so as to wind the fixing tool lifting/lowering wire 33d until the fixing tool 33f abuts on the grating 9 (S6), thereby ending an operation of fixing the support apparatus 30 (S10). The width of the horizontally open fixing tool 33f in the horizontal direction is wider than the width of the gap of the grating 9. Therefore, the fixing tool 33f cannot escape through the grating 9. As the fixing tool 33f is caught by the gap of the grating 9, the support apparatus 30 is fixed onto the grating 9.

When the support apparatus controller 20 moves the support apparatus 30, there is a need to remove the fixing tool 33f from the grating 9. In this case, in Step S2, the support apparatus control section 22 selects to release the fixed fixing section 33 in accordance with an operational input from the operation section 23 (S2).

As the operation section 23 selects to release the fixed fixing section 33, the support apparatus control section 22 drives the fixing tool lifting/lowering motor 33a and rotates the fixing tool lifting/lowering drum 33b so as to stretch the fixing tool lifting/lowering wire 33d, thereby releasing the fixed fixing section 33 (S7). In this case, the fixing tool 33f which is in contact with the lower surface of the grating 9 is separated from the lower surface of the grating 9.

Subsequently, the support apparatus control section 22 drives the fixing tool transformation motor 33c and stretches the fixing tool transformation wire 33e, thereby closing the fixing tool 33f (S8). Then, the support apparatus control section 22 drives the fixing tool lifting/lowering motor 33a and rotates the fixing tool lifting/lowering drum 33b so as to wind the fixing tool lifting/lowering wire 33d (S9), thereby ending an operation of releasing the fixed fixing section 33 (S10). In this case, the support apparatus control section 22 lifts the fixing tool 33f to the upper surface and accommodates the fixing tool 33f in an accommodation section (not illustrated) which is provided on the side surface of the right wheel crawler 31R. Thereafter, the support apparatus control section 22 moves the support apparatus 30.

The fixing section 33 attached to the left wheel crawler 31L is operated similar to the fixing section 33 attached to the right wheel crawler 31R.

In addition, as the fixing section 33, for example, outriggers may be provided in the left wheel crawler 31L and the right wheel crawler 31R. In addition, as the fixing tool, for example, an interposition mechanism which interposes a lattice of the grating 9 therebetween may be used.

<Constitutional Example of Support Controller>

FIG. 10 illustrates a detailed constitutional example of the operation section 23 included in the support apparatus controller 20. The illustration of the display section 21 will be omitted.

The operation section 23 includes a power source light emitting diode (LED) 101, a crawler controller 102, a form variation controller 103, and a cable support controller 104.

When a worker turns on a power button (not illustrated), the power source LED 101 is lit. As the power source LED 101 is lit, the worker can confirm that the support apparatus 30 is in a reception state to be operated. Then, the worker operates the crawler controller 102, the form variation controller 103, and the cable support controller 104, thereby controlling the support apparatus 30. Thereafter, as the worker turns off the power button, light of the power source LED 101 is out. In this case, the worker can confirm that the support apparatus 30 stops the operation and the support apparatus 30 is not in the reception state for an operation.

The crawler controller 102 includes a joystick 102a which a worker tilts in cross directions so as to be able to operate the support apparatus 30. When the worker pushes down the joystick 102a in a vertical direction 102b, the support apparatus 30 moves back and forth. In addition, when the worker pushes down the joystick 102a in a lateral direction 102c, the support apparatus 30 performs an operation of turning to the right and left.

The form variation controller 103 can individually control the left wheel crawler 31L and the right wheel crawler 31R while having the arrow A1 direction of the support apparatus housing 35 as the forward direction. The form variation controller 103 includes buttons 103a to 103d.

The button 103a is used in order to dispose the left wheel crawler 31L in series with respect to the support apparatus housing 35, and the button 103b is used in order to dispose the left wheel crawler 31L in parallel with respect to the support apparatus housing 35. The button 103c is used in order to dispose the right wheel crawler 31R in series with respect to the support apparatus housing 35, and the button 103d is used in order to dispose the right wheel crawler 31R in parallel with respect to the support apparatus housing 35.

In addition, the cable support controller 104 controls the fixing section 33 in order to fix the support apparatus 30 to the grating 9 in the vicinity of the opening section 10. The cable support controller 104 includes buttons 104a to 104f, and as a worker presses each of the buttons, an operational input is carried out with respect to the support apparatus control section 22.

The fixing section lowering button 104a stretches the fixing tool lifting/lowering wire 33d, thereby executing an instruction of lowering the fixing tool 33f. The fixing section lifting button 104b winds the fixing tool lifting/lowering wire 33d, thereby executing an instruction of lifting the fixing tool 33f. The fixing section deployment button 104c feeds the fixing tool transformation wire 33e, thereby opening the fixing tool 33f, and the fixing section accommodation button 104d winds the fixing tool transformation wire 33e, thereby executing an instruction of closing the fixing tool 33f. Then, after the support apparatus 30 is fixed to the grating 9, buttons 104e and 104f are activated. The cable letting-off button 104e executes an instruction of letting off the cable 14 for an investigation apparatus, and the cable winding button 104f executes an instruction of winding the cable 14 for an investigation apparatus.

<Shape of Investigation Apparatus Traveling Flat Surface>

Subsequently, descriptions will be given regarding a constitutional example and an operational example of the investigation apparatus 50.

FIG. 11 illustrates the external constitutional example of the investigation apparatus 50 which travels the flat surface. Here, descriptions will be given regarding the investigation apparatus 50 in which the left wheel crawler 51L and the right wheel crawler 51R are disposed in parallel. The arrows A1 to A4 illustrated in FIGS. 11 and 12 represents the forward direction and the turning direction of the investigation apparatus 50, similar to the arrows A1 to A4 illustrated in FIG. 4.

The investigation apparatus 50 includes a substantially rectangular parallelepiped investigation apparatus housing 57, and the left wheel crawler 51L and the right wheel crawler 51R which are respectively attached to both ends of the investigation apparatus housing 57. The left wheel crawler 51L and the right wheel crawler 51R are used as examples of the traveling section 51, thereby traveling in the rotary direction (in one direction) of the left wheel crawler 51L and the right wheel crawler 51R. The cable 14 for an investigation apparatus is connected to the left wheel crawler 51L.

When the investigation apparatus 50 performs linear-traveling, that is, moving forward in the narrow portion, the left wheel crawler 51L and the right wheel crawler 51R are disposed in series, and when the investigation apparatus 50 performs flat surface-traveling, that is, moving on the grating 9 or the nuclear reactor pressure vessel bottom section 11, the left wheel crawler 51L and the right wheel crawler 51R are disposed in parallel.

The investigation apparatus housing 57 includes a placement plate 59 in which various types of components are placed. The placement plate 59 has a substantially rectangular shape, and both ends thereof protrude in the longitudinal direction of the investigation apparatus housing 57. The form variation section 52 and the camera section 53 are provided on the placement plate 59. The left wheel crawler 51L and the right wheel crawler 51R are attached to the investigation apparatus housing 57 via the form variation section 52. The form variation section 52 is constituted similar to the above-described form variation section 32 illustrated in FIG. 4A and operates similar to the form variation section 32. Therefore, attachment angles of the left wheel crawler 51L and the right wheel crawler 51R with respect to the investigation apparatus housing 57 can vary by the form variation section 52. Then, the left wheel crawler 51L and the right wheel crawler 51R are disposed in series or in parallel with respect to the investigation apparatus housing 57 by the form variation section 52.

The camera section 53 includes a camera pan mechanism section 54, a camera tilt mechanism section 55, and a camera main body 56 (a camera lens column). The orientation of the camera main body 56 can change vertically and laterally by operating the camera pan mechanism section 54 and the camera tilt mechanism section 55.

The camera pan mechanism section 54 is placed on the placement plate 59. Then, the camera pan mechanism section 54 includes a motor 54a for a camera pan, a worm gear 54b for a camera pan, and a gear 54c for a camera pan. When the motor 54a for a camera pan is driven, the worm gear 54b for a camera pan which is connected to the rotary shaft of the motor 54a for a camera pan rotates, and the gear 54c for a camera pan connected to the worm gear 54b for a camera pan rotates. When the gear 54c for a camera pan rotates, the camera main body 56 which is integrally attached to the gear 54c for a camera pan performs an operation within a horizontal plane, that is, a pan operation. The pan operation is also used for the purpose of changing the orientation of the camera main body 56 when the investigation apparatus 50 passes through the narrow portion as illustrated in FIG. 12, in addition to swinging the camera main body 56 to the right and left within the horizontal plane.

The camera tilt mechanism section 55 is provided on the gear 54c for a camera pan. The camera tilt mechanism section 55 includes a motor 55a for a camera tilt, a worm gear 55b for a camera tilt, and a gear 55c for a camera tilt. When the motor 55a for a camera tilt rotates, the worm gear 55b for a camera tilt which is connected to the rotary shaft of the motor 55a for a camera tilt rotates, and the gear 55c for a camera tilt which is connected to the worm gear 55b for a camera tilt and is provided on the side surface of the camera main body 56 rotates. In accordance with the gear 55c for a camera tilt, the camera main body 56 performs an operation within a perpendicular plane, that is, a tilt operation. Then, the camera section 53 can perform imaging in a wide range by combining the camera pan mechanism section 54 and the camera tilt mechanism section 55.

A portion of the investigation apparatus housing 57 on the arrow A1 direction side is notched in a substantially semi-elliptical shape. Therefore, when the camera main body 56 is oriented directly downward, it is possible to image the floor surface of a place where the investigation apparatus 50 is located. In addition, the tilting angle of the camera main body 56 can be adjusted by changing the position of the gear 55c for a camera tilt with respect to the side surface of the camera main body 56.

<Shape of Investigation Apparatus Traveling Narrow Portion>

FIG. 12 illustrates a constitutional example of the investigation apparatus 50 which travels the narrow portion. Here, descriptions will be given regarding the investigation apparatus 50 in which the left wheel crawler 51L and the right wheel crawler 51R are disposed in series.

In the investigation apparatus 50, the left wheel crawler 51L, the investigation apparatus housing 57, and the right wheel crawler 51R are disposed in series as the form variation section 52 is driven. In addition, as described above, as the camera pan mechanism section 54 performs the pan operation, the orientation of the camera main body 56 is changed in accordance with the forward direction of the investigation apparatus 50. Accordingly, the camera main body 56 is prevented from protruding from the side surface of the investigation apparatus housing 57. Then, the investigation apparatus 50 is enabled to travel the narrow portion.

The camera main body 56 includes an infrared light cutting filter 56a, a lens 56b, an imaging element 56c, a laser beam source 56d, and an LED irradiation section 56e. The infrared light cutting filter 56a can be detached from the optical axis of the camera main body 56. The lens 56b is used in order to concentrate image light. As the imaging element 56c, for example, a charge coupled device (CCD) imager is used for outputting image data based on an image signal which is generated by image light imaged on the surface. The laser beam source 56d is used in order to emit a laser beam, and thereby measure a distance from the investigation apparatus 50 to the investigation target (refer to FIGS. 17 to 20 described below). The LED irradiation section 56e is provided in order to illuminate the investigation target in an imaging direction. The LED irradiation section 56e is controlled by the investigation apparatus controller 40 regarding an ON-OFF state of light emitting. In addition, in the camera main body 56, as the lens 56b moves in an optical axis direction, it is possible to perform focusing or zoom-in with respect to the investigation target.

When performing imaging by using visible rays in a state where the camera main body 56 is oriented toward the investigation target, the infrared light cutting filter 56a is provided in the front of the lens 56b, thereby cutting infrared light. In this manner, only the visible rays in which infrared light is cut pass through the lens 56b, and image light is imaged on an imaging surface of the imaging element 56c. However, when performing imaging by using infrared light (for example, at the time of temperature measurement), the infrared light cutting filter 56a is slid and the infrared light cutting filter 56a is detached from the lens 56b. Accordingly, only infrared light passes through the lens 56b, and image light is imaged on the imaging surface of the imaging element 56c by using infrared light. Then, the imaging element 56c outputs the image data through the cable 14 for an investigation apparatus.

<Example of Processing of Investigation Apparatus Control Section>

Subsequently, descriptions will be given regarding an example of processing of various types of investigation performed by the investigation apparatus control section 42 based on the image which is acquired by the camera section 53 of the investigation apparatus 50.

FIG. 13 illustrates contents of processing for each function in investigation performed by the investigation apparatus control section 42 based on the image which is acquired by the camera section 53.

The investigation apparatus 50 starts investigation of the investigation target (S11). While performing the investigation, the investigation apparatus control section 42 selects a function in accordance with the purpose of investigation (S12). There are three types of functions to be selected by the investigation apparatus control section 42, such as a self-position detection function, a temperature measurement function, and a dose rate measurement function, which are processed respectively by the self-position detection section 42a, the temperature measurement section 42b, and the dose rate measurement section 42c.

When the investigation apparatus control section 42 selects the self-position detection function, the self-position detection section 42a starts the processing of self-position detection. Initially, the self-position detection section 42a issues an instruction to the camera section 53 so as to fix the camera main body 56 downward (S13). However, if the camera main body 56 is retained so as to be oriented directly downward, the display section 41 only displays an image of the surface of the nuclear reactor pressure vessel bottom section 11, and thus, it is difficult for a worker to operate the investigation apparatus 50 by screening the image.

Therefore, the self-position detection section 42a issues an instruction to the camera section 53 so as to fix the camera main body 56 at an angle at which the image includes the state of the forward direction of the investigation apparatus 50 (for example, 45 degrees downward with respect to the horizontal plane). The aforementioned angle differs depending on the angle of view of the lens 56b and the angle of the camera tilt mechanism section 55. For this reason, a worker determines whether or not the tilt of the camera main body 56 is acceptable while screening the image which the display section 41 displays. Subsequently, the self-position detection section 42a initializes the self-position of the investigation apparatus 50 (S14).

The self-position detection section 42a applies coordinates (0, 0) as an origin of the relative coordinates, or applies absolute coordinates (X0, Y0) to an initial position based on disposition data of the investigation target which is ascertained in advance, thereby initializing the self-position of the investigation apparatus 50. Thereafter, the self-position detection section 42a acquires an initial image (S15), and proceeds to a two-dimensional movement quantity calculation process (S16).

The self-position detection section 42a which has proceeded to the two-dimensional movement quantity calculation process acquires an image captured by the imaging element 56c (S17), and calculates a two-dimensional correlation with respect to the image which has acquired until the previous step (S18). When the processing of Step S16 is performed for the first time, the self-position detection section 42a calculates the two-dimensional correlation with respect to the initial image which is acquired in Step S15.

Subsequently, the self-position detection section 42a calculates a two-dimensional movement quantity of the investigation apparatus 50 based on the calculated result of the two-dimensional correlation (S19). Subsequently, the self-position detection section 42a adds the two-dimensional movement quantity calculated in Step S19 to the self-position which has calculated until the previous step, and corrects the self-position (S20), thereby outputting the corrected self-position to the display section 41 (S21). Accordingly, a worker can grasp the current position of the investigation apparatus 50.

The investigation apparatus control section 42 can select the self-position detection function not only when the investigation apparatus 50 approaches the investigation target but also the investigation apparatus 50 travels the narrow portion, the grating 9, or the flat surface of the nuclear reactor pressure vessel bottom section 11 and the like. Then, the self-position detection section 42a detects the self-position of the investigation apparatus 50 by repeating Steps S16 to S21 of the two-dimensional movement quantity calculation process while the investigation apparatus 50 is traveling. The self-position detection section 42a ends the processing of self-position detection when the investigation apparatus 50 arrives at the position where the investigation target is investigated and stops there, or when the investigation apparatus control section 42 selects another function for temperature measurement or dose rate measurement (S31). Therefore, the processing of selecting a function in Step S2 can cut in while the two-dimensional movement quantity calculation process is executed.

When the investigation apparatus control section 42 selects temperature measurement through the processing of selecting a function in Step S2, the temperature measurement section 42b starts the processing of measuring a temperature. Then, the temperature measurement section 42b drives the camera pan mechanism section 54 or the camera tilt mechanism section 55, and causes the lens 56b of the camera main body 56 to be oriented toward the investigation target (S22). Subsequently, the temperature measurement section 42b detaches the infrared light cutting filter 56a, and allows infrared light to transmit through the lens 56b in addition to visible rays (S23).

Then, the temperature measurement section 42b acquires image data of the infrared light image which is imaged by the imaging element 56c (S24), thereby analyzing the histogram inside the infrared light image (S25). Lastly, the temperature measurement section 42b outputs temperature distribution of the investigation target to the display section 41, based on points indicated in the infrared light image and the corresponding histogram (S26), thereby ending the processing (S31).

In addition, when the investigation apparatus control section 42 selects dose rate measurement through the processing of selecting a function in Step S2, the dose rate measurement section 42c starts the processing of measuring a dose rate. Then, the dose rate measurement section 42c turns off illumination of the LED irradiation section 56e (S27). When the illumination of the LED irradiation section 56e is turned off, the vicinity of the investigation target becomes dark completely. For this reason, it is difficult for a worker to distinguish the position of the investigation target. Therefore, in Step S27, the dose rate measurement section 42c sometimes causes the illumination of the LED irradiation section 56e to be dark to the extent that a worker can visually recognize white spot noises of radial rays generated in the image.

Subsequently, the dose rate measurement section 42c acquires an image from the camera section 53 (S28), and performs binarization processing on the image. Thereafter, the number of independent white spots generated in the image is counted (S29). The white spot is noise which is generated when radial rays pass through the imaging element 56c. The more number of the white spots generated in the image denotes the environment of a higher dose rate. Then, the dose rate measurement section 42c outputs the dose rate at a place where the investigation apparatus 50 is positioned to the display section 41 (S30), thereby ending the processing (S31).

At the timing when a worker turns on the power of the investigation apparatus controller 40, the investigation apparatus control section 42 which has passed through Steps S1 and S2 may select the self-position detection function. In addition, at the timing when the worker turns off the power of the investigation apparatus controller 40, the investigation apparatus control section 42 retains a final self-position. Then, at the timing when the worker turns on the power of the investigation apparatus controller 40 again, it is possible to cause the display section 41 to display the final self-position as the current position of the investigation apparatus 50.

Subsequently, descriptions will be given regarding an example of an image which is used when the dose rate measurement section 42c measures the dose rate, with reference to FIGS. 14 and 15.

FIG. 14 illustrates an example of an image which is displayed by the display section 41. Illustration of the display section 41 will be omitted.

As radial rays are incident on the imaging element 56c, the white spot noises are generated randomly in the image which is acquired by the dose rate measurement section 42c. When the camera section 53 images the investigation target under an environment of a high dose rate, the display section 41 displays an image 71 which includes many white spot noises. In addition, when the camera section 53 images the investigation target under an environment of a low dose rate, the display section 41 displays an image 72 which has a white spot noise quantity lower than that of the image 71. Meanwhile, when the camera section 53 images the investigation target under an environment where there is no influence of radial rays, the display section 41 displays an image 73 in which no white spot noise has occurred.

FIG. 15 illustrates an example in which the dose rate measurement section 42c calculating the dose rates based on the number of white spot noises included in the image under an environment where the investigation target is imaged.

The dose rate measurement section 42c has a conversion graph 74 for converting the number of white spot noises into a dose rate. It is indicated that the dose rate corresponding to the number of white spot noises included in one screen is determined based on the conversion graph 74. Therefore, the dose rate measurement section 42c can obtain the dose rate from the number of white spot noises counted in the image.

<Constitutional Example of Investigation Apparatus Controller>

FIG. 16 illustrates a detailed constitutional example of the operation section 43 which is included in the investigation apparatus controller 40.

The operation section 43 includes a power source LED 111, a crawler controller 112, a form variation controller 113, and a camera controller 114.

When a worker turns on the power button (not illustrated) for power ON, the power source LED 111 is lit. As the power source LED 111 is lit, the worker can confirm that the investigation apparatus 50 is in a reception state to be operated. Thereafter, as the worker turns off the power button, light of the power source LED 111 is out. In this case, the investigation apparatus 50 stops the operation.

When the worker pushes down a joystick 112a of the crawler controller 112 in a vertical direction 112b, the investigation apparatus 50 moves back and forth, and when the joystick 112a is pushed down in a lateral direction 112c, the investigation apparatus 50 performs an operation of turning to the right and left.

A button 113a of the form variation controller 113 is used in order to dispose the left wheel crawler 51L in series, and a button 113b is used in order to dispose the left wheel crawler 51L in parallel. A button 113c is used in order to dispose the right wheel crawler 51R in series, and a button 113d is used in order to dispose the right wheel crawler 51R in parallel.

The camera controller 114 includes buttons 114a to 114j.

A camera in-use button 114a executes an instruction so as to cause the camera main body 56 to perform the pan operation in an in-use state illustrated in FIG. 11. The camera containment button 114b executes an instruction so as to cause the camera main body 56 to perform the pan operation in a containment state illustrated in FIG. 12.

Moreover, in the camera in-use state illustrated in FIG. 11, the upward tilt button 114c executes an instruction so as to cause the camera main body 56 to perform an upward tilt operation, and the downward tilt button 114d executes an instruction so as to cause the camera main body 56 to perform a downward tilt operation. In addition, the close-up focus button 114e executes an instruction so as to focus on the investigation target at a position close to the investigation apparatus 50, and the distant focus button 114f executes an instruction so as to focus on the investigation target at a position distant away from the investigation apparatus 50. The illumination button 114g executes an instruction so as to control ON and OFF of the LED irradiation section 56e, and the illumination adjustment dial 114h executes an instruction so as to adjust the intensity of illumination of the LED irradiation section 56e. The laser beam source switch 114i executes an instruction so as to control ON and OFF of the laser beam source 56d, and the laser intensity adjustment dial 114j executes an instruction so as to adjust the intensity of a laser beam of the laser beam source 56d.

According to the investigation system 15 in the first exemplary embodiment described above, letting-off and winding of the cable 14 for an investigation apparatus connected to the investigation apparatus 50 is supported by the support apparatus 30. In this case, the support apparatus 30 moves to an optimal place where the cable 14 for an investigation apparatus is unlikely to be entangled by an obstacle. Therefore, the cable 14 for an investigation apparatus which is drawn by the investigation apparatus 50 over a long distance is unlikely to be entangled by an obstacle. Accordingly, the investigation apparatus 50 can move across a wide range inside the structure, and can investigate and inspect the peripheral environment of the investigation target.

Moreover, when the support apparatus 30 and the investigation apparatus 50 travel the narrow portion, the crawlers are respectively disposed in series, and when traveling the flat surface, the crawlers are respectively disposed in parallel. In this manner, by appropriately disposing the crawlers in accordance with the environment where the support apparatus 30 and the investigation apparatus 50 travel, it is possible to enhance traveling stability of the support apparatus 30 and the investigation apparatus 50.

In addition, the investigation apparatus control section 42 performs self-position detection of the investigation apparatus 50, temperature measurement of the investigation target, and dose rate measurement based on an image received from the camera section 53 via the cable 14 for an investigation apparatus. Accordingly, a worker can perform necessary investigation inside the structure from a place away from the investigation apparatus 50.

In addition, the support apparatus 30 is fixed to the grating 9 by the fixing section 33. Therefore, when the support apparatus 30 performs letting-off and winding of the cable 14 for an investigation apparatus, it is possible to avoid a situation in which the cable 14 for an investigation apparatus drags and moves the support apparatus 30.

Second Exemplary Embodiment

Subsequently, descriptions will be given regarding constitution of the investigation system 15 in a second exemplary embodiment of the present invention, with reference to FIGS. 17 to 20. Here, another method of calculating the self-position of the investigation apparatus 50 will be described.

FIG. 17 illustrates a constitutional example of a camera section 53A.

The camera section 53A according to the second exemplary embodiment includes a camera main body 56A. Illustration will be omitted regarding the camera pan mechanism section 54 and the camera tilt mechanism section 55 which are provided so as to correspond to the camera main body 56A.

The camera main body 56A includes the lens 56b, the imaging element 56c, the LED irradiation section 56e, and the laser beam source 56d.

The imaging element 56c can image the investigation target at an angle of view $\alpha_V$ in the perpendicular direction and an angle of view $\alpha_H$ in the horizontal direction of the lens 56b (refer to FIG. 18A described below). In the image captured by the imaging element 56c, image light of the investigation target which is irradiated with a laser beam is captured. The LED irradiation section 56e irradiates the investigation target with diffused light. The laser beam source 56d irradiates the investigation target with a slit laser beam in the horizontal direction. Here, the distance between the optical axis of the lens 56b and the optical axis of the laser beam source 56d is represented by the reference numeral d.

FIGS. 18A and 18B illustrate examples of a method of measuring a distance L from the investigation apparatus 50 to an investigation target 81. FIG. 18A illustrates an example of a positional relationship between the investigation apparatus 50 and the investigation target 81 in a top view, and FIG. 18B illustrates an example of an image in which the investigation target irradiated with a slit laser beam is captured.

As illustrated in FIG. 18A, the camera section 53A provided in the investigation apparatus 50 in which the left wheel crawler 51L and the right wheel crawler 51R are disposed in parallel images the investigation targets 81, 82, and 83. Here, a direction perpendicular to the imaging direction of the camera section 53A is indicated by a dotted line F in FIG. 18A. Then, the length of a perpendicular line from the dotted line F to one point 84 of the investigation target 81 with respect to the dotted line F is set as the distance L from the investigation apparatus 50 to the investigation target 81.

In an image 80 which is displayed in the display section 41 illustrated in FIG. 18B, there is an appearance of a FIG. 85 of a slit laser beam shown on the investigation targets 81, 82, and 83 or a floor surface by a bright line as the laser beam source 56d irradiates the investigation targets 81, 82, and 83 with a laser beam.

Then, the self-position detection section 42a calculates the distance L through the following Expression (1). Expression (1) employs a total number A of pixels of the image 80 in the vertical direction, and a number B of pixels from the upper end of a screen to the one point 84 where a slit laser beam reaches. In addition, the distance d between the optical axis of the lens 56b and the optical axis of the laser beam source 56d, and the angle of view $\alpha_V$ of the lens 56b in the perpendicular direction are employed.

[Expression 1]

$$L = \frac{d \cdot A}{(2 \cdot B - A) \cdot \tan\left(\frac{\alpha_V}{2}\right)} \quad (1)$$

Subsequently, descriptions will be given regarding a method of calculating the self-position of the investigation apparatus 50 performed by the self-position detection section 42a, with reference to FIGS. 19 and 20.

FIG. 19 illustrates the method of calculating the self-position of the investigation apparatus 50 performed by the self-position detection section 42a.

Here, a position where the lens 56b is provided in the camera main body 56A is set as a self-position coordinates 90 of the investigation apparatus 50. Then, the self-position detection section 42a calculates distances from a plurality of the investigation targets of which the positions are ascertained in advance to the investigation apparatus 50, based on a captured image of the investigation targets which are irradiated with slit laser beams, thereby obtaining the current position of the investigation apparatus 50.

For example, the self-position detection section 42a calculates coordinates 91 of the known investigation target 81, and a distance 93 to the investigation target 81 calculated through the above-described Expression (1). Moreover, the self-position detection section 42a calculates coordinates 92 of the known investigation target 83, and a distance 94 to the investigation target 83 calculated through the above-described Expression (1). The distances 93 and 94 are indicated by dotted arcs which are respectively centered on the coordinates 91 and 92. Thereafter, the self-position detection section 42a calculates an intersection point of circles indicated based on the distances 93 and 94, as the self-position coordinates 90.

FIG. 20 illustrates a method of calculating a height and a gap of the investigation target which exists in the front of the investigation apparatus 50, performed by the self-position detection section 42a.

An image 120 displayed in the display section 41 of the investigation apparatus controller 40 is shown by a pixel group of the total number $A_Y$ of pixels in the perpendicular direction and the total number $A_X$ of pixels in the horizontal direction. Then, when a slit laser beam reaches the investigation target of which the height or the gap are intended to be measured by a worker, a figure 121 shown by a substantially horizontal bright line is captured in the image 120. In this case, a number B of pixels from the upper end of the image 120 to the figure 121, a number of pixels $C_H$ in the image 120 from the upper end to the lower end of the investigation target of which the height is intended to be measured, and a number of pixels $C_W$ in the image 120 from the left end to the right end of the investigation target of which the width is intended to be measured are set.

Then, through the following Expressions (2) to (4), the self-position detection section 42a calculates the distance L from the investigation apparatus 50 to the figure 121 shown by a slit laser beam, a height H of the investigation target, and a width (or a gap) W of the investigation target.

[Expression 2]

$$L = \frac{d \cdot A_Y}{(2 \cdot B - A_Y) \cdot \tan\left(\frac{\alpha_V}{2}\right)} \quad (2)$$

$$H = L \cdot 2 \cdot \tan\left(\frac{\alpha_V}{2}\right) \cdot \frac{C_H}{A_Y} \quad (3)$$

$$W = L \cdot 2 \cdot \tan\left(\frac{\alpha_H}{2}\right) \cdot \frac{C_W}{A_X} \quad (4)$$

The self-position detection section 42a causes the display section 41 to display the height H of the investigation target and the width of (or the gap) W of the investigation target which are calculated. Accordingly, a worker can grasp the state of the investigation target even though the investigation target is in an unknown space, and thus, the investigation apparatus 50 can be easily moved.

According to the above-described investigation system 15 in the second exemplary embodiment, as the laser beam source 56d irradiates the investigation target with a slit laser beam, the self-position detection section 42a can accurately obtain the self-position of the investigation apparatus 50 and can calculate the height and the width (or the gap) of the investigation target. Therefore, it is possible for a worker to grasp a state of the investigation target which exists in the forward direction of the investigation apparatus 50 and to move the investigation apparatus 50 so as not to collide with the investigation target.

Third Exemplary Embodiment

Subsequently, descriptions will be given regarding a constitutional example of an investigation system 15A in a third exemplary embodiment of the present invention, with reference to FIG. 21.

FIG. 21 illustrates an example of the internal constitution of the investigation system 15A.

The investigation system 15A includes a first support apparatus controller 20A, a second support apparatus controller 20B, a first support apparatus 30A, a second support apparatus 30B, the investigation apparatus controller 40, and the investigation apparatus 50. The first support apparatus controller 20A and the first support apparatus 30A are connected to each other through a cable 13A for a support apparatus. The second support apparatus controller 20B and the second support apparatus 30B are connected to each other through a cable 13B for a support apparatus.

The constitutional example and the operational example of the first support apparatus controller 20A and the second support apparatus controller 20B are similar to those of the above-described support apparatus controller 20 in the first exemplary embodiment.

In addition, the constitutional example and the operational example of the first support apparatus 30A and the second support apparatus 30B are similar to those of the above-described support apparatus 30 in the first exemplary embodiment.

Here, the first support apparatus 30A and the second support apparatus 30B perform letting-off and winding of a cable 14A for an investigation apparatus at two different points. Therefore, the length of the cable 14A for an investigation apparatus in the present exemplary embodiment can be lengthened than the cable 14 for an investigation apparatus in the first exemplary embodiment. Accordingly, the movement range of the investigation apparatus 50 is widened further, and thus, the investigation apparatus 50 can perform investigation of an investigation target within a wide range.

Three or more support apparatuses 30 may be provided, and the cable 14A for an investigation apparatus which is lengthened further may be connected to the investigation apparatus 50. Accordingly, the investigation apparatus 50 can perform investigation within a further wider range.

Fourth Exemplary Embodiment

Subsequently, descriptions will be given regarding a constitutional example of a circular section crawler 130 in a fourth exemplary embodiment of the present invention, with reference to FIG. 22.

FIGS. 22A, 22B, 22C and 22D illustrate structures of the circular section crawler 130. FIG. 22A is the top view of the circular section crawler 130, FIG. 22B is the bottom view of the circular section crawler 130, FIG. 22C is the front view of the circular section crawler 130, and FIG. 22D is a side view of the circular section crawler 130.

The circular section crawler 130 can travel in two directions orthogonal to each other. The circular section crawler 130 can be replaced with any one of the left wheel crawler 31L and the right wheel crawler 31R in the support apparatus 30, and the left wheel crawler 51L and the right wheel crawler 51R in the investigation apparatus 50 which are described above.

The circular section crawler 130 includes crawler track-shaped roller drive sections 132a and 132b which are surrounded by a crawler case 131. The crawler track-shaped roller drive sections 132a and 132b are supported by a long axis rotary shaft 133 in a longitudinal direction X. In addition, two of the crawler track-shaped roller drive sections 132a and 132b can rotate in a direction W1 of the longitudinal direction and can rotate in a Y direction W2 orthogonal to the direction W1 of the longitudinal direction as well. According, the support apparatus 30 and the investigation apparatus 50 can move in all directions.

In addition, by rotating in the Y direction W2, the circular section crawler 130 can change the position with respect to each of the housings similar to the left wheel crawler 31L, the right wheel crawler 31R, the left wheel crawler 51L, and the right wheel crawler 51R which are described above. Therefore, when the circular section crawler 130 is used, each of the housings does not have to be provided with the form variation sections 32 and 52.

Modification Example

Without being limited to nuclear power plants, the investigation systems 15 and 15A are also used in investigation and inspection for the narrow portion and the flat surface portion in various types of power plants such as thermal power plants, hydraulic power plants, and wind power plants. In addition, the investigation systems 15 and 15A may be adopted in investigation and inspection for petroleum plants, factories, and the like.

In addition, each of the support apparatus 30 and the investigation apparatus 50 may include three or more crawlers. Accordingly, even when one crawler is caught by refuse or the like and the crawler does not move, the support apparatus 30 and the investigation apparatus 50 can move by using remaining crawlers.

In addition, each process of the self-position detection, the temperature measurement, and the dose rate measurement which are performed by the investigation apparatus control section 42 may be performed by the investigation apparatus 50 itself. Then, the investigation apparatus 50 may transmit the measurement result only to the investigation apparatus controller 40 via the cable 14 for an investigation apparatus.

In addition, an image captured by the support apparatus 30 may be output to the support apparatus controller 20 by mounting the camera section in the support apparatus 30. Accordingly, a worker can accurately grasp the current position of the support apparatus 30.

In addition, if the internal constitution of the structure is ascertained in advance, the support apparatus 30 can travel by itself and reach the target position without being controlled by the support apparatus controller 20. Similarly, the investigation apparatus 50 can also travel by itself and reach the target position without being controlled by the investigation apparatus controller 40.

In addition, the present invention is not limited to the above-described exemplary embodiments. Naturally, various application examples and modification examples can be adopted without departing from the gist of the present invention disclosed in Claims.

For example, the foregoing exemplary embodiments are specifically described in the detail regarding constitution of the apparatus and the system in order to describe the present invention so as to be easily understood. The present invention is not necessarily limited to the exemplary embodiment which includes the complete constitution described above. In addition, a portion of the constitution in a certain embodiment can be replaced by the constitution in other embodiments. Furthermore, the constitution in other embodiments can be added to the constitution in a certain embodiment. Moreover, addition, deletion, and replacement of the different constitution can be executed in a portion of the constitution in each embodiment.

In addition, the control lines and the information lines are presented which are considered to be necessary in the descriptions. However, all the control lines and the information lines are not necessarily presented in a product. Practically, it may be considered that almost every constitution is mutually connected.

REFERENCE SIGNS LIST

13 . . . CABLE FOR SUPPORT APPARATUS, 14 . . . CABLE FOR INVESTIGATION APPARATUS, 15 . . . INVESTIGATION SYSTEM, 20 . . . SUPPORT APPARATUS CONTROLLER, 22 . . . SUPPORT APPARATUS CONTROL SECTION, 30 . . . SUPPORT APPARATUS, 31 . . . TRAVELING SECTION, 33 . . . FIXING SECTION, 34 . . . CABLE SUPPORT SECTION, 40 . . . INVESTIGATION APPARATUS CONTROLLER, 42 . . . INVESTIGATION APPARATUS CONTROL SECTION, 50 . . . INVESTIGATION APPARATUS, 51 . . . TRAVELING SECTION

The invention claimed is:

1. An investigation system comprising:

an investigation apparatus that includes an investigation apparatus housing including a first plate mounted thereon, a camera disposed on the first plate and configured to output an image of an investigation target through a cable connected to the investigation apparatus, a first crawler attached to a first end of the first plate which protrudes from the investigation apparatus housing, a second crawler attached to a second end, opposite to the first end, of the first plate which protrudes from the investigation apparatus housing, a first form variation section that attaches the first crawler to the first end of the first plate and which varies an attachment angle of the first crawler, and a second form variation section that attaches the second crawler to the second end of the first plate and which varies an attachment angle of the second crawler; and a support apparatus, separate from the investigation apparatus, that includes a support apparatus housing including a second plate mounted thereon, a cable support disposed on the second plate and configured to feed the cable to the investigation apparatus in a first direction and from the investigation apparatus in a second direction, a third crawler attached to a first end of the second plate which protrudes from the support apparatus housing, a fourth crawler attached to a second end, opposite the first end, of the second plate which protrudes from the support apparatus housing, a third form variation section that attaches the third crawler to the second plate and which varies an attachment angle of the third crawler, and a fourth form variation section that attaches the fourth crawler to the second plate and which varies an attachment angle of the fourth crawler, wherein the first form variation section varies the attachment angle of the first crawler between the first crawler being in parallel with the investigation apparatus housing and the first crawler being perpendicular to the investigation apparatus housing, wherein the second form variation section varies the attachment angle of the second crawler between the second crawler being in parallel with the investigation apparatus housing and the second crawler being perpendicular to the investigation apparatus housing independent of the first form variation section, wherein the third form variation section varies the attachment angle of the third crawler between the third crawler being in parallel with the support apparatus housing and the third crawler being perpendicular to the support apparatus housing, wherein the fourth form variation section varies the attachment angle of the fourth crawler between the fourth crawler being in parallel with the support apparatus housing and the fourth crawler being perpendicular to the support apparatus housing independent of the third form variation section, wherein the first crawler and the second crawler are configured to move the investigation apparatus in a plurality of directions, wherein the third crawler and the fourth crawler are configured to move the support apparatus in the plurality of directions independent from the investigation apparatus, and wherein the cable support includes a first active pulley driven by a first worm gear and a first motor, a second active pulley driven by a second worm gear and a second motor and a passive pulley therebetween which interpose the cable to feed the cable in the first direction and the second direction, and the first active pulley, the second active pulley and the passive pulley are configured to let off and wind the cable in association with each other.

2. The investigation system according to claim 1, wherein at least one of the third crawler and the fourth crawler includes a fixing section which fixes the support apparatus to a position for feeding the cable to the investigation apparatus.

3. The investigation system according to claim 1, further comprising:

an investigation apparatus controller that is configured to control the investigation apparatus via the cable; and a support apparatus controller that is configured to control the support apparatus via another cable which is connected to the support apparatus, wherein the investigation apparatus controller is further configured to perform a predetermined investigation based on the image which is acquired by the camera via the cable.

4. The investigation system according to claim 3, wherein the investigation apparatus controller is further configured to detect a current position of the investigation apparatus, measure a temperature of the investigation target, and measure a radiation dose rate under an environment where the investigation target exists.

5. The investigation system according to claim 4, wherein the camera images the investigation target with a combination of a pan, a tilt, a focus, and zoom-in, and wherein the investigation apparatus controller is further configured to calculate a two-dimensional movement quantity based on the image and detect the current position of the investigation apparatus based on the two-dimensional movement quantity.

6. The investigation system according to claim 4, wherein the camera includes a slit laser beam source which irradiates the investigation target with a slit laser beam, and wherein the investigation apparatus controller is further configured to calculate distances from a plurality of the investigation targets of which positions are ascertained in advance, with respect to the investigation apparatus based on the captured image of the investigation target which is irradiated with the slit laser beam, and detect the current position of the investigation apparatus based on the calculated distances.

7. The investigation system according to claim 1, wherein the first crawler and the second crawler are each circular crawlers configured to travel in two directions orthogonal to each other or the third crawler and the fourth crawler are each circular crawlers configured to travel in the two directions orthogonal to each other.

8. The investigation system according to claim 1, wherein the investigation apparatus further includes a laser beam source configured to irradiate slit laser beam on the inspection target and a processor that is programmed to calculate coordinates of the investigation target and another predetermined object which are irradiated by the slit laser beam in the image output from the camera, calculate a first distance from the camera to the investigation target and a second distance from the camera to the other object, and determine an intersection of a first arc having the first distance from the investigation target and a second arc having the second distance from the other object as a position of the investigation apparatus.

9. The slit laser beam on the inspection target and a processor that is programmed to calculate a height and a width of the inspection target based on the image output from the camera in which the inspection target is irradiated with the slit laser beam.

10. An investigation system comprising:
an investigation apparatus that includes an investigation apparatus housing including a first plate mounted thereon, a camera disposed on the first plate and configured to output an image of an investigation target through a cable connected to the investigation apparatus, a first crawler attached to a first end of the first plate which protrudes from the investigation apparatus housing, a second crawler attached to a second end, opposite to the first end, of the first plate which protrudes from the investigation apparatus housing, a first form variation section that attaches the first crawler to the first end of the first plate and which varies an attachment angle of the first crawler, and a second form variation section that attaches the second crawler to the second end of the first plate and which varies an attachment angle of the second crawler; and
a plurality of support apparatuses separate from the investigation apparatus,
and each respectively including a support apparatus housing including a second plate mounted thereon, a cable support disposed on the second plate and configured to feed the cable towards the investigation apparatus and from the investigation apparatus, a third crawler attached to a first end of the second plate which protrudes from the support apparatus housing, a fourth crawler attached to a second end,
opposite the first end, of the second plate which protrudes from the support apparatus housing, a third form variation section that attaches the third crawler to the second plate and which varies an attachment angle of the third crawler, and a fourth form variation section that attaches the fourth crawler to the second plate and which varies an attachment angle of the fourth crawler,
wherein the first form variation section varies the attachment angle of the first crawler between the first crawler being in parallel with the investigation apparatus housing and the first crawler being perpendicular to the investigation apparatus housing,
wherein the second form variation section varies the attachment angle of the second crawler between the second crawler being in parallel with the investigation apparatus housing and the second crawler being perpendicular to the investigation apparatus housing independent of the first form variation section,
wherein the first crawler and the second crawler are configured to move the investigation apparatus in a plurality of directions,
wherein the third crawler and the fourth crawler of each respective support apparatus are configured to move the respective support apparatus in the plurality of directions independent from the investigation apparatus and the other support apparatuses,
wherein the cable support includes a first active pulley driven by a first worm gear and a first motor, a second active pulley driven by a second worm gear and a second motor and a passive pulley therebetween which interpose the cable to feed the cable in the first direction and the second direction, and the first active pulley, the second active pulley and the passive pulley are configured to let off and wind the cable in association with each other, and
wherein each of the support apparatuses supports the cable for the investigation apparatus.

11. The investigation system according to claim 10, wherein the plurality of support apparatuses include three or more support apparatuses.

12. An investigation system comprising:
an investigation apparatus that includes an investigation apparatus housing that moves in a plurality of directions, and a camera disposed on the investigation apparatus housing and which is configured to output an image via a cable connected to the investigation apparatus; and
a support apparatus, separate from the investigation apparatus, that includes
a support apparatus housing including a plate mounted thereon, a cable support disposed on the plate and configured to feed the cable to the investigation apparatus, a first crawler attached to a first end of the plate which protrudes from the support apparatus housing, a second crawler attached to a second end, opposite the first end, of the plate which protrudes from the support apparatus housing, a first form variation section that attaches the first crawler to the plate and which varies an attachment angle of the first crawler, and a second form variation section that attaches the second crawler to the plate and which varies an attachment angle of the second crawler,
wherein the first form variation section varies the attachment angle of the first crawler between the first crawler being in parallel with the support apparatus housing and the first crawler being perpendicular to the support apparatus housing, wherein the second form variation section varies the attachment angle of the second crawler between the second crawler being in parallel with the support apparatus housing and the second crawler being perpendicular to the support apparatus housing independent of the first form variation section,
wherein the first crawler and the second crawler are configured to move the support apparatus in the plurality of directions independent from the investigation apparatus, and
wherein the cable support includes a first active pulley driven by a first worm gear and a first motor, a second active pulley driven by a second worm gear and a second motor and a passive pulley therebetween which interpose the cable to feed the cable in the first direction and the second direction, and the first active pulley, the second active pulley and the passive pulley are configured to let off and wind the cable in association with each other.

* * * * *